US012355260B2

(12) United States Patent
Oh et al.

(10) Patent No.: US 12,355,260 B2
(45) Date of Patent: Jul. 8, 2025

(54) ELECTRONIC DEVICE CAPABLE OF WIRELESS CHARGING

(71) Applicant: SAMSUNG ELECTRONICS CO., LTD., Suwon-si (KR)

(72) Inventors: Wooyoung Oh, Suwon-si (KR); Heonseok Lee, Suwon-si (KR); Jungtae Kim, Suwon-si (KR); Sujin Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/105,602

(22) Filed: Feb. 3, 2023

(65) Prior Publication Data

US 2023/0187972 A1    Jun. 15, 2023

Related U.S. Application Data

(63) Continuation of application No. PCT/KR2021/010259, filed on Aug. 4, 2021.

(30) Foreign Application Priority Data

Aug. 4, 2020   (KR) .................. 10-2020-0097669

(51) Int. Cl.
*G06F 3/041*    (2006.01)
*G06F 1/16*     (2006.01)
(Continued)

(52) U.S. Cl.
CPC ............ *H02J 50/10* (2016.02); *G06F 1/1643* (2013.01); *G06F 1/1683* (2013.01); *G06F 1/169* (2013.01);
(Continued)

(58) Field of Classification Search
None
See application file for complete search history.

(56) References Cited

U.S. PATENT DOCUMENTS 11,237,650 B2      2/2022  Kim et al.
2006/0132465 A1*   6/2006  Nishikawa ............. G06F 3/045
                                                         345/174
(Continued)

FOREIGN PATENT DOCUMENTS

EP    3611601 A1     2/2020
JP    2006227714 A   8/2006
(Continued)

OTHER PUBLICATIONS

International Search Report (PCT/ISA/210) issued Nov. 11, 2021 from the International Searching Authority to International Application No. PCT/KR2021/010259.
(Continued)

*Primary Examiner* — Amr A Awad
*Assistant Examiner* — Donna V Bocar
(74) *Attorney, Agent, or Firm* — Sughrue Mion, PLLC

(57) ABSTRACT

An electronic device capable of wireless charging for a pen-type input device includes a display, a touch panel coupled to the display and having a plurality of sides facing in different directions, a conductive trace connected to the touch panel to receive a touch signal detected on the touch panel, and a wireless charging pad configured to wirelessly transmit power to the pen-type input device and disposed adjacent to one side of the plurality of sides of the touch panel, and the conductive trace is disposed on another side of the plurality of sides of the touch panel, the another side of the touch panel being opposite to the one side of the touch panel.

11 Claims, 18 Drawing Sheets

(51) Int. Cl.
  G06F 1/26 (2006.01)
  G06F 3/0354 (2013.01)
  H02J 50/00 (2016.01)
  H02J 50/10 (2016.01)
(52) U.S. Cl.
  CPC .......... G06F 1/266 (2013.01); G06F 3/03545 (2013.01); G06F 3/0412 (2013.01); H02J 50/005 (2020.01)

(56) References Cited

U.S. PATENT DOCUMENTS

| | | |
|---|---|---|
| 2010/0277327 A1 | 11/2010 | Lee |
| 2012/0249449 A1 | 10/2012 | Tseng et al. |
| 2014/0111475 A1 | 4/2014 | Bae |
| 2015/0185800 A1 | 7/2015 | Narayanan et al. |
| 2015/0199062 A1 | 7/2015 | Lang |
| 2015/0241992 A1 | 8/2015 | Cho |
| 2016/0224086 A1* | 8/2016 | Kim .................... G06F 3/03545 |
| 2016/0282970 A1 | 9/2016 | Evreinov et al. |
| 2017/0025887 A1 | 1/2017 | Hyun et al. |
| 2017/0068337 A1 | 3/2017 | Bhandari et al. |
| 2017/0068339 A1 | 3/2017 | Zimmerman et al. |
| 2017/0115755 A1* | 4/2017 | Jung .................... A61B 5/0205 |
| 2018/0018028 A1 | 1/2018 | Lee et al. |
| 2018/0314349 A1* | 11/2018 | Jiang .................... H02J 50/005 |
| 2018/0329527 A1* | 11/2018 | Park .................... G06F 3/0383 |
| 2020/0012353 A1 | 1/2020 | Kim et al. |
| 2020/0050338 A1 | 2/2020 | Choi et al. |
| 2020/0097102 A1 | 3/2020 | Zhang et al. |
| 2021/0026513 A1* | 1/2021 | Lee .................... G06F 3/04164 |
| 2021/0141491 A1* | 5/2021 | Gogte .................... G06F 3/0446 |
| 2021/0303089 A1 | 9/2021 | Ruscher et al. |
| 2021/0325981 A1 | 10/2021 | Park et al. |
| 2021/0349553 A1 | 11/2021 | Lee et al. |
| 2023/0067179 A1* | 3/2023 | Kim .................... H02J 50/12 |

FOREIGN PATENT DOCUMENTS

| | | |
|---|---|---|
| JP | 2016186696 A | 10/2016 |
| JP | 2020030840 A | 2/2020 |
| KR | 1020100107996 A | 10/2010 |
| KR | 1020120136215 A | 12/2012 |
| KR | 1020130123067 A | 11/2013 |
| KR | 1020160095947 A | 8/2016 |
| KR | 1020170011507 A | 2/2017 |
| KR | 1020180035879 A | 4/2018 |
| KR | 1020180124398 A | 11/2018 |
| KR | 10-2020-0005849 A | 1/2020 |
| KR | 1020200012387 A | 2/2020 |
| KR | 1020200017305 A | 2/2020 |
| KR | 1020200017883 A | 2/2020 |
| KR | 1020200035343 A | 4/2020 |
| WO | 2017044311 A1 | 3/2017 |
| WO | 2020060580 A1 | 3/2020 |

OTHER PUBLICATIONS

Written Opinion (PCT/ISA/237) issued Nov. 11, 2021 from the Internationsl Searching Authority to International Application No. PCT/KR2021/010259.
Extended European Search Report dated Jul. 24, 2024, issued by the European Patent Office in European Application No. 21854639.8.
Communication dated Aug. 13, 2024, issued by Intellectual Property India in Indian Application No. 202317014284.
Communication issued Apr. 29, 2024 by the European Patent Office for EP Patent Application No. 21854639.8.
Communication issued on Sep. 19, 2024 by the Korean Intellectual Property Office for Korean Patent Application No. 10-2020-0097669.

* cited by examiner

| | Analog | Digital | Touch performance |
|---|---|---|---|
| normal | Default | Default | Best |
| pre-noise | Changed | Default | Maintain as best |
| noise | Changed | Changed | Changed |

ELECTRONIC DEVICE CAPABLE OF WIRELESS CHARGING

CROSS-REFERENCE TO RELATED APPLICATION(S)

This application is a bypass continuation of International Application No. PCT/KR2021/010259, filed on Aug. 4, 2021, which is based on and claims priority to Korean Patent Application No. 10-2020-0097669, filed on Aug. 4, 2020, in the Korean Intellectual Property Office, the disclosure of which is incorporated by reference herein in its entirety.

BACKGROUND ART

1. Field

Various embodiments of the disclosure relate to an electronic device capable of wirelessly charging a pen-type input device.

2. Description of Related Art

Portable electronic devices such as smartphones or tablet PCs are capable of receiving inputs by the user's body part or a pen-type input device, e.g., a stylus pen, and may include a touchscreen panel (hereinafter, 'touch panel') for detecting various types of inputs. The user may designate specific coordinates of the touchscreen panel by means of the user's finger or a pen-type input device. The user may input a specific signal to a smartphone or tablet PC by designating specific coordinates on the touchscreen.

As an example of the touch panel, e.g., a digitizer panel may be disposed inside the housing of the electronic device. According to an embodiment, the digitizer panel may be disposed in a position adjacent to the display panel to form a magnetic field. The electronic device may detect the signal returned by the formed magnetic field to determine the position of the input device (e.g., a stylus pen having an EMR function).

The touch panel may include a transmission pattern (e.g., Tx pattern) and a reception pattern (e.g., Rx pattern) on the touch panel. The patterns may be electrically connected to a touch IC (e.g., touch circuit) to transmit/receive the touch signal. A plurality of conductive traces may be used as a means for electrically connecting the transmission pattern and reception pattern to the touch IC, which may be vulnerable to the influence (e.g., noise) of the ambient magnetic field. The noise may hamper smooth transmission/reception of the touch signal, affecting the driving of the touch panel.

For example, in an electronic device having a pen-type input device, when a plurality of conductive traces are connected to the touch panel, the touch input by a pen-type input device or the user's body part may not be implemented or a malfunction may be caused by the noise generated during the wireless charging operation of the pen-type input device.

According to various embodiments of the disclosure, there is provided an electronic device having a conductive trace and a connecting structure therefor, which prevent deterioration of the touch function due to charging noise during a wireless charging operation of a pen-type input device in the electronic device capable of wireless charging for the pen-type input device.

According to various embodiments of the disclosure, there is provided a method for operating an electronic device to avoid influence of charging noise by a pen-type input device and/or wireless charging pad during a wireless charging operation for the pen-type input device.

SUMMARY

According to an embodiment of the disclosure, an electronic device capable of wireless charging for a pen-type input device includes a display, a touch panel coupled to the display and having a plurality of sides facing in different directions, a conductive trace connected to at least one side of the plurality of sides of the touch panel to transfer a touch signal detected on the touch panel to a touch circuit, and a wireless charging pad configured to wirelessly transmit power to the pen-type input device and disposed adjacent to one side of the plurality of sides of the touch panel, and the conductive trace is disposed on another side of the plurality of sides of the touch panel, the another side of the touch panel being opposite to the one side of the touch panel where the wireless charging pad is disposed.

The conductive trace may include 1-1th conductive traces disposed on a first side of the plurality of sides of the touch panel, and 1-2th conductive traces disposed on a second side of the plurality of sides of the touch panel and spaced apart from the wireless charging pad by a predetermined distance, and the wireless charging pad is disposed adjacent to the second side of the plurality of sides of the touch panel.

The 1-2th conductive traces may extend in a direction away from the wireless charging pad.

The electronic device may further include a touch circuit for processing the touch signal, and the 1-1th conductive traces and the 1-2th conductive traces extend to the touch circuit in a single routing structure.

The conductive trace may further include 2-1th conductive traces disposed on a third side of the plurality of sides of the touch panel, and 2-2th conductive traces disposed on a fourth side of the plurality of sides of the touch panel.

The 2-2th conductive traces may extend in one direction, and the 2-1th conductive traces are bent one or more times and extend adjacent to and in parallel to the 1-1 conductive traces.

The electronic device may further include a housing including an internal space for receiving the pen-type input device.

The wireless charging pad may face in a direction opposite to the touch panel with respect to the pen-type input device.

The electronic device may further include a housing, and the pen-type input device is attachable to an outer surface of the housing.

The wireless charging pad may be disposed adjacent to a side of the housing.

According to another embodiment of the disclosure, a method for avoiding charging noise of an electronic device capable of wireless charging for a pen-type input device includes determining whether the pen-type input device is inserted into the electronic device; setting a mode of a touch circuit of the electronic device to a pre-noise mode, detecting a noise level of a touch panel of the electronic device, and setting the mode of the touch circuit to a noise mode based on the detected noise level being a first predetermined value or more.

The setting of the mode of the touch circuit to the pre-noise mode may include changing an operation frequency of the touch panel to a frequency at which interference with a charging frequency of the wireless charging is smaller than a first predetermined level.

The setting of the mode of the touch circuit to the pre-noise mode may include increasing a sampling count for touch input on the touch panel.

The setting of the mode of the touch circuit to the noise mode may include changing an operation frequency of the touch panel into a frequency at which interference with a charging frequency of the wireless charging is smaller than interference in the pre-noise mode.

The method may further include, before setting the mode of the touch circuit to the pre-noise mode, determining whether to perform wireless charging for the pen-type input device.

The electronic device may include a wireless charging pad disposed adjacent to one side of the touch panel and a conductive trace disposed on another side of the touch panel to transfer a touch signal detected on the touch panel to the touch circuit.

The method may further include determining whether a noise level of the touch panel is a second predetermined value or more based on the touch circuit being set to the noise mode.

The method may further include maintaining the noise mode based on the noise level being the second predetermined value or more.

According to an embodiment of the disclosure, an electronic device includes a processor, and a memory storing instructions executable by the processor and the processor is configured to determine whether wireless charging of a pen-type input device inserted into or attached to the electronic device is in progress, based on the wireless charging of the pen-type input device being in progress, set a mode of a touch circuit of the electronic device to a pre-noise mode, detect a noise level of the touch pane, and set the mode of the touch circuit to a noise mode based on the detected noise level being a first predetermined value or more.

According to an embodiment of the disclosure, an electronic device capable of wireless charging for a pen-type input device includes a display, a touch panel coupled the display and including a plurality of first patterns for generating a touch signal and a plurality of second patterns perpendicular to the plurality of first patterns and having a plurality of sides facing in different directions; a conductive trace for transferring the touch signal to a touch circuit of the electronic device and including a 1-1th conductive trace connected to one side of at least one of the plurality of first patterns, a 1-2th conductive trace connected to another side of at least one of the plurality of first patterns, a 2-1th conductive trace connected to one side of at least one of the plurality of second patterns, and a 2-2th conductive trace connected to another side of at least one of the plurality of second patterns; a wireless charging pad for wirelessly transmitting power to the pen-type input device and disposed adjacent to one side of the plurality of sides of the touch panel, and wherein the conductive trace is disposed on another side of the plurality of sides of the touch panel, the another side of the touch panel being opposite to the one side of the touch panel where the wireless charging pad is disposed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
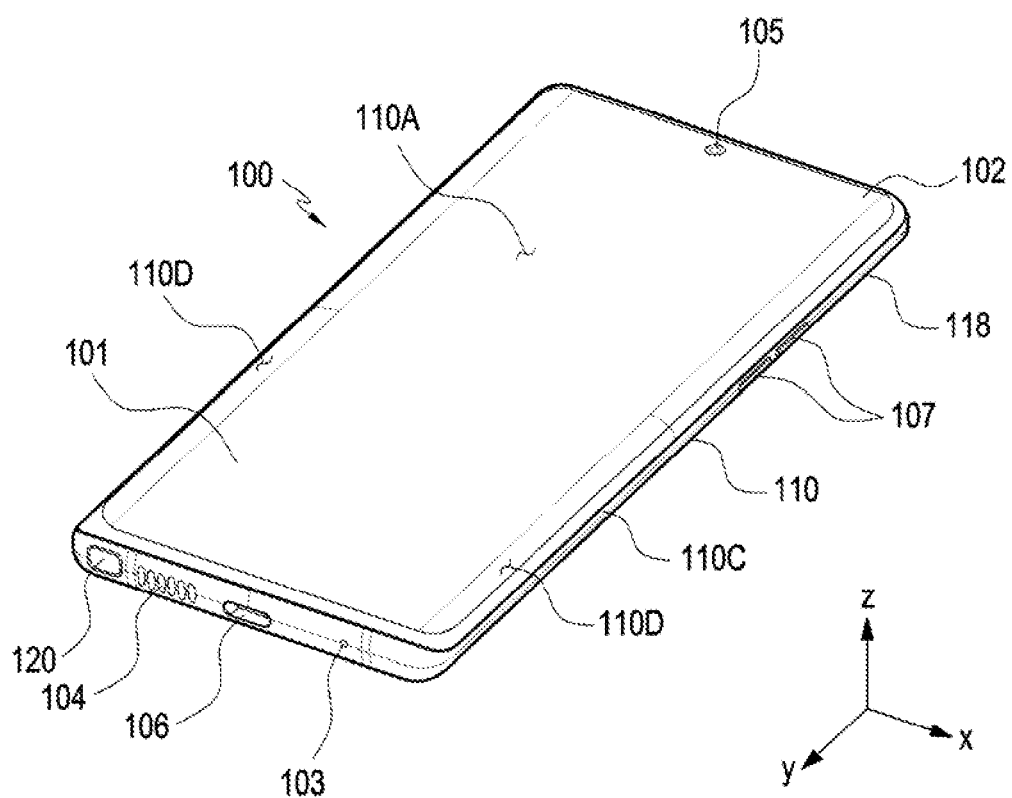
FIG. 1 is a front perspective view illustrating a mobile electronic device according to an embodiment.
Figure 2:
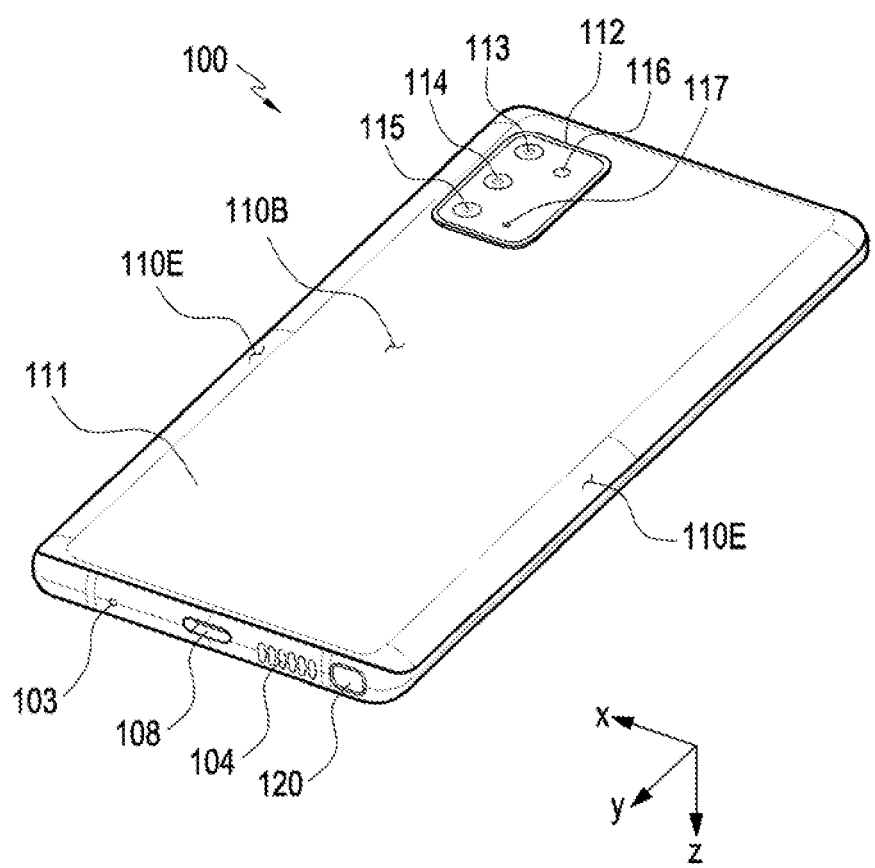
FIG. 2 is a rear perspective view illustrating the electronic device of FIG. 1.
Figure 3:
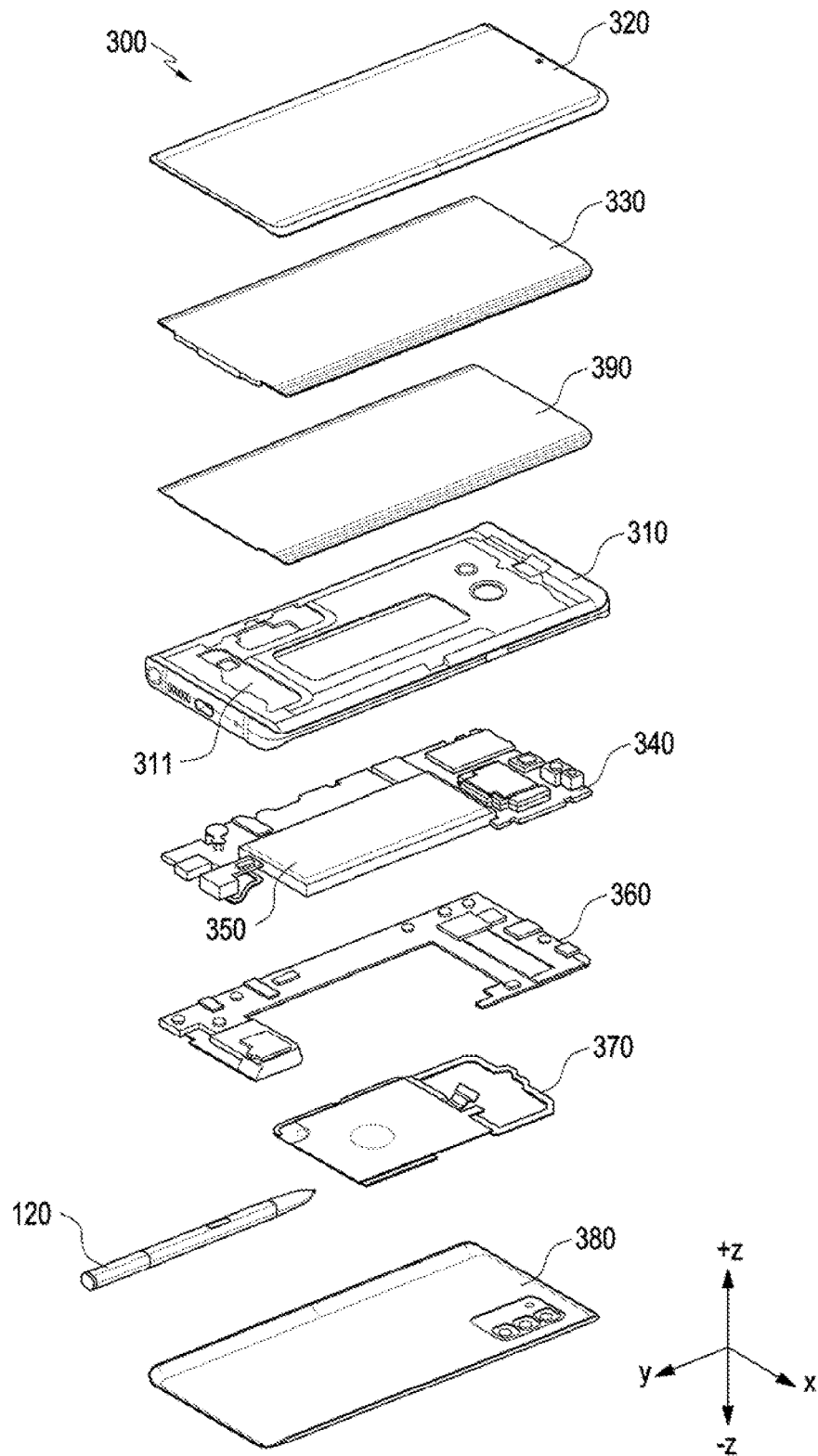
FIG. 3 is an exploded perspective view illustrating the electronic device of FIG. 1.

FIG. 1 is a front perspective view illustrating a mobile electronic device 100 according to an embodiment. FIG. 2 is a rear perspective view illustrating the electronic device 100 of FIG. 1. FIG. 3 is an exploded perspective view illustrating an electronic device 300 (e.g., the electronic device 100 of FIG. 1).

Referring to FIGS. 1 and 2, the electronic device 100 according to an embodiment may include a housing 110 including a first surface (or front surface) 110A, a second surface (or rear surface) 110B, and a side surface 110C surrounding a space between the first surface 110A and the second surface 110B. According to another embodiment (not shown), the housing may denote a structure forming a part of the first surface 110A, the second surface 110B, and the side surface 110C of FIG. 1. According to an embodiment, at least a part of the first surface 110A may have a substantially transparent front plate 102 (e.g., a glass plate or polymer plate including various coat layers). The second surface 110B may be formed by a rear plate 111 that is substantially opaque. The rear plate 111 may be formed of, e.g., laminated or colored glass, ceramic, polymer, metal (e.g., aluminum, stainless steel (STS), or magnesium), or a combination of at least two thereof. The side surface 110C may be formed by a side bezel structure (or a "side member") 118 that is coupled to the front plate 102 and the rear plate 111 and includes a metal and/or polymer. According to an embodiment, the rear plate 111 and the side bezel structure 118 may be integrally formed together and include the same material (e.g., a metal, such as aluminum).

In the embodiment illustrated, the front plate 102 may include two first areas 110D, which seamlessly and bendingly extend from the first surface 110A to the rear plate 111, on both the long edges of the front plate 102. In the illustrated embodiment (see FIG. 2), the rear plate 111 has two second areas 110E, which are bent, and seamlessly extend, from the second surface 110B toward the front plate 102, at two opposite long edge ends. In an embodiment, the front plate 102 (or the rear plate 111) may include only one of the first areas 110D (or the second areas 110E). In another embodiment, some of the first areas 110D or the second areas 110E may not be included. According to an embodiment, at a side view of the electronic device 100, the side bezel structure 118 may have a first thickness (or width) for sides that do not have the first areas 110D or the second areas 110E and a second thickness, which is smaller than the first thickness, for sides that have the first areas 110D or the second areas 110E.

According to an embodiment, the electronic device 100 may include at least one of a display 101, audio modules 103 and 104, camera modules 105, 113, 114, and 115, a key input device 107, and a connector hole 106. According to an embodiment, the electronic device 100 may exclude at least one (e.g., the key input device 107) of the components or may add other components. For example, the other components may be a sensor module or a light emitting element.

The display 101 may be visually exposed through a significant portion of the front plate 102. In some embodiments, at least a portion of the display 101 may be exposed through the front plate 102 forming the first surface 110A and the first areas 110D of the side surface 110C. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101.

According to an embodiment, the surface (or the front plate 102) of the housing 110 may include a screen display area formed as the display 101 is visually exposed. For example, the screen display area may include the front surface 110A and first edge areas 110D. The display 201 may include, e.g., a liquid crystal display (LCD), a light emitting diode (LED) display, an organic light emitting diode (OLED) display, or a microelectromechanical systems (MEMS) display, or an electronic paper display. The display 201 may display, e.g., various contents (e.g., text, images, videos, icons, or symbols) to the user.

According to an embodiment (not shown), the screen display area of the display 101 may have a recess or opening in a portion of the screen display area, and at least one or more of the audio modules 103 and 104, camera modules 105, 113, 114, and 115, a sensor module, and a light emitting element may be aligned with the recess or opening. According to another embodiment (not shown), at least one of the audio modules 103 and 104, camera modules 105, 113, 114, and 115, a sensor module, and a light emitting element may be included on the rear surface of the screen display area of the display 101. According to another embodiment (not shown), the display 101 may be disposed to be coupled with, or adjacent, a touch detecting circuit, a pressure sensor capable of measuring the strength (pressure) of touches, and/or a touch panel (e.g., digitizer) for detecting a magnetic field-type stylus pen. According to an embodiment, at least a part of the sensor module and/or at least a part of the key input device 107 may be disposed in the first areas 110D and/or the second areas 110E.

The audio modules 103 and 104 may include a microphone hole 103 and a speaker hole 104. A microphone for acquiring external sounds may be disposed in the microphone hole 103. In some embodiments, a plurality of microphones may be disposed to detect the direction of the sound. The speaker hole 104 may include an external speaker hole 104 and a phone receiver hole (not shown). According to an embodiment, the speaker hole 104 and the microphone hole 103 may be implemented as a single hole, or a speaker may be included without the speaker hole 104 (e.g., piezo speaker).

The sensor module may generate an electrical signal or data value corresponding to an internal operating state or external environmental state of the electronic device 100. The electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 117.

The camera modules 105, 113, 114, and 115 may include a first camera device 105 disposed on the first surface 110A of the electronic device 100, and second camera devices 113, 114, and 115 and/or a flash 116 disposed on the second surface 110B. The camera devices 105, 113, 114, and 115 may include one or more lenses, an image sensor, and/or an image signal processor. The flash 116 may include, e.g., a light emitting diode (LED) or a xenon lamp. Some camera devices 113, 114, and 115 may include wide-angle and/or telephoto lenses. According to an embodiment, two or more lenses (an infrared (IR) camera, a wide-angle lens, and a telephoto lens) and image sensors may be disposed on one surface of the electronic device 100.

The key input device 107 may be disposed on the side surface 110C of the housing 110. According to another embodiment, the electronic device 100 may exclude all or some of the above-mentioned key input devices 107 and the excluded key input devices 107 may be implemented in other forms, e.g., as soft keys, on the display 101. According to an embodiment, the key input device may include the sensor module disposed on the second surface 110B of the housing 110.

The light emitting element may provide, e.g., information about the state of the electronic device 100 in the form of light. According to another embodiment, the light emitting element may provide a light source that interacts with, e.g., the camera modules 105, 113, 114, and 115. The light emitting element may include, e.g., a light emitting device (LED), an IR LED, and/or a xenon lamp.

According to an embodiment, the camera module 105 and/or the sensor module may be disposed to contact the external environment through a designated area of the display 101 and the front plate 102 from the internal space of the electronic device 100. For example, the designated area may be an area in which pixels are not disposed in the display 101. As another example, the designated area may be an area in which pixels are disposed in the display 101. When viewed from above the display 101, at least a portion of the designated area may overlap the camera module 105 and/or the sensor module. As another example, some sensor modules may be arranged to perform their functions without being visually exposed through the front plate 102 from the internal space of the electronic device.

The connector hole 106 may include a first connector hole 106 for receiving a connector (e.g., a universal serial bus (USB) connector) for transmitting or receiving power and/or data to/from an external electronic device and/or a second connector hole (e.g., an earphone jack) for receiving a connector for transmitting or receiving audio signals to/from the external electronic device.

The pen-type input device 120 (e.g., a stylus pen) may be guided and detachably inserted through a hole (e.g., the hole 121 of FIG. 4A described below) formed in a side surface of the housing 110 into the inside of the housing 110. The pen-type input device 120 may include a button for easy detachment. A separate resonant circuit may be embedded in the pen-type input device 120 and may interwork with a touch panel (e.g., the touch panel 390 described below) (e.g., a digitizer) included in the electronic device 100. The pen-type input device 120 may come in, e.g., an electromagnetic resonance (EMR), active electrical stylus (AES), or electric coupled resonance (ECR) scheme.

Referring to FIG. 3, an electronic device 300 may include a side bezel structure 310, a first supporting member 311 (e.g., a bracket), a front plate 320, a display 330, an touch panel 390, a printed circuit board 340, a battery 350, an second supporting member 360 (e.g., a rear case), an antenna 370, a pen-type input device 120, and a rear plate 380. According to an embodiment, the electronic device 300 may exclude at least one (e.g., the first supporting member 311 or second supporting member 360) of the components or may add other components. At least one of the components of the electronic device 300 may be the same or similar to at least one of the components of the electronic device 100 of FIG. 1 or 2 and no duplicate description is made below.

The touch panel 390 (e.g., a digitizer) may be a panel for detecting input by the pen-type input device 120. For example, the touch panel 390 may include a printed circuit board (PCB) (e.g., a flexible printed circuit board (FPCB)) and a shielding sheet. The shielding sheet may prevent inter-component interference by an electromagnetic field generated from the components (e.g., display module, PCB, or touch panel) included in the electronic device 300. The shielding sheet may shield off electromagnetic fields produced from the components, thereby allowing an input from the pen-type input device 120 to be precisely delivered to the coil included in the touch panel 390.

According to an embodiment, the display 330 may, at least partially, be formed of a material that transmits radio waves or magnetic fields. In the display 330, the display panel and/or the touch panel 390 may be integrated. Accordingly, the display 330 may be utilized as an input device equipped with touchscreen functionality, not alone as an output device for outputting screen. The display panel may include a display element layer including at least one pixel(s) and a TFT layer connected to the display element layer. According to various embodiments, the display panel may be a panel, such as of LCD, LED, or AMOLED, and display various images according to various operation states of the electronic device 300 and execution of the application, and contents.

According to an embodiment, the touch panel 390 and the display 330 may be integrated into one component (e.g., the display 330).

The first supporting member 311 may be disposed inside the electronic device 300 to be connected with the side bezel structure 310 or integrated with the side bezel structure 310. The first supporting member 311 may be formed of, e.g., a metal and/or non-metallic material (e.g., polymer). The display 330 may be joined onto one surface of the first supporting member 311, and the printed circuit board 340 may be joined onto the opposite surface of the first supporting member 311. A processor, memory, and/or interface may be mounted on the printed circuit board 340. According to an embodiment, the printed circuit board 340 may include a flexible printed circuit board type radio frequency cable (FRC). For example, the printed circuit board 340 may be disposed on at least a portion of the first supporting member 311 and may be electrically connected to the antenna module and the communication module.

The battery 350 may be a device for supplying power to at least one component of the electronic device 300. The battery 450 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The second supporting member 360 (e.g., a rear case) may be disposed between the printed circuit board 340 and the antenna 370. For example, the second supporting member 360 may include one surface to which at least one of the printed circuit board 340 and the battery 350 is coupled, and another surface to which the antenna 370 is coupled.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. For example, the antenna 370 may include a coil for wireless charging. According to an embodiment, an antenna structure may be formed by a portion or combination of the side bezel structure 310 and/or the first supporting member 311.

The rear plate 380 may form at least a portion of the rear surface (e.g., the rear surface 110B of FIG. 2) of the electronic device 300. According to an embodiment, the rear plate 380 may be coupled with the side bezel structure 310 of the electronic device 300 or may be integrally formed with the side bezel structure 310.

Figure 4A:
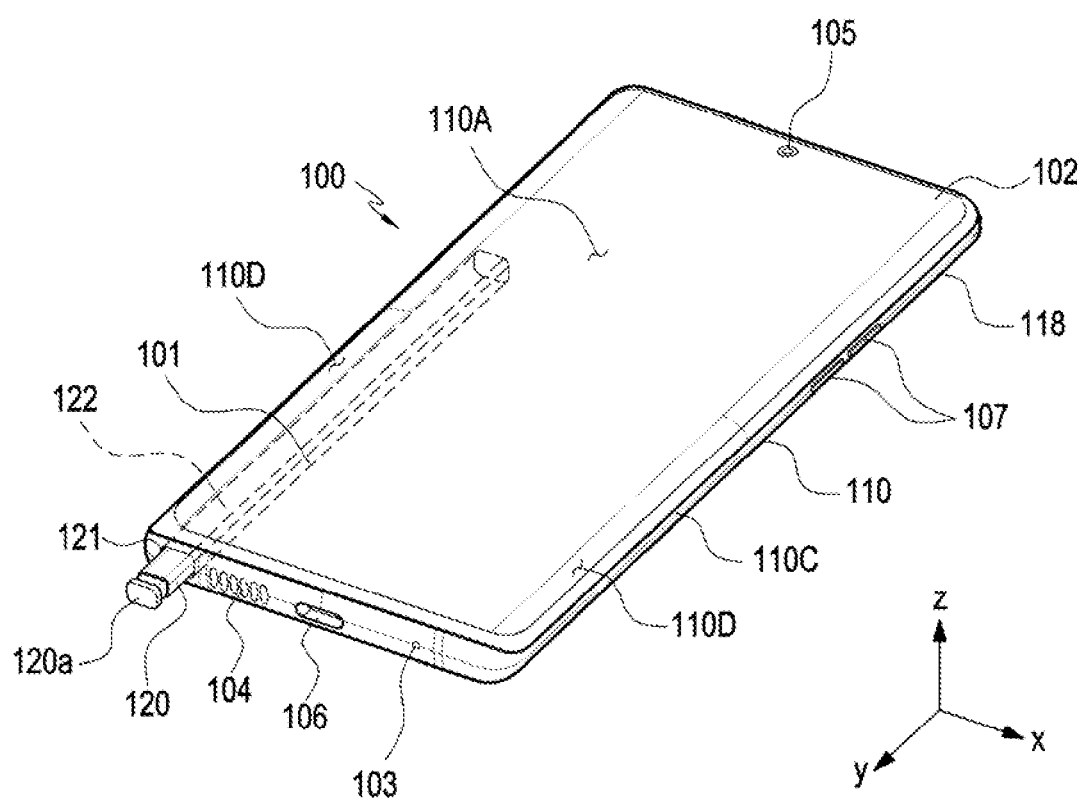
FIG. 4A is a perspective view illustrating an electronic device according to various embodiments and an example in which a portion of a pen-type input device is inserted into the electronic device according to various embodiments.

FIG. 4A is a perspective view illustrating an electronic device 100 according to various embodiments and an example in which a portion of a pen-type input device 120 is inserted into the electronic device 100 according to various embodiments.

Referring to FIG. 4A, a hole 121 may be formed in a portion of the housing 110 of the electronic device 100, e.g., in a portion of a side surface 110C. The electronic device 100 may include a receiving space 122 exposed to the outside through the hole 121, and the pen-type input device 120 may be inserted in the electronic device 100 through the receiving space 122.

According to various embodiments, the pen-type input device 120 may include a button unit 120a on an end of the device 120, as a component for pulling the pen-type input device 120 out of the receiving space 122 of the electronic device 100. If the user pushes the button unit 120a, repulsive force providing elements (e.g., at least one spring) configured in association with the button unit 120a may work, allowing the pen-type input device 120 to escape from the receiving space 122.

According to various embodiments, the pen-type input device 120 may include antenna devices that may perform communication (e.g., Bluetooth low energy (BLE)) with the electronic device 100 when the input device 120 is received in the receiving space 122 or when the input device 120 is removed from, and positioned outside the electronic device 100.

According to various embodiments, the electronic device 100 may include a structure in which the pen-type input device 120 may be attached to the outside of the electronic device 100. For example, the electronic device 100 may include at least one magnetic substance in a position adjacent to the side surface (e.g., the side surface 110C of FIG. 1). The pen-type input device 120 may be attached to the outside of the housing 110 of the electronic device 100 through at least one magnetic substance.

According to various embodiments, if the pen-type input device 120 is inserted into the receiving space 122 or attached to a side surface of the electronic device 100, the electronic device 100 may transmit a charging signal through the conductive coil included in the electronic device 100 to charge the pen-type input device 120. The conductive coil may be disposed in a position adjacent to the receiving space 122, or may be disposed in a partial area of a side surface of the electronic device 100. As another example, the conductive coil may be disposed in a position at least partially overlapping the display 101 when viewed from above the electronic device 100. The conductive coil may be implemented as the wireless charging pad 600 of FIG. 6 as described below.

Figure 4B:
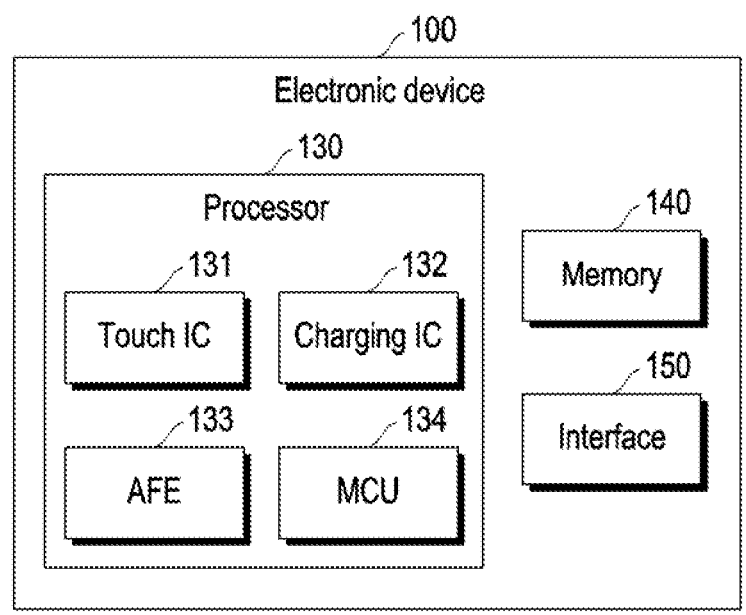
FIG. 4B is a block diagram illustrating an electronic device according to various embodiments of the disclosure.

FIG. 4B is a block diagram illustrating an electronic device 100 according to various embodiments of the disclosure.

The electronic device 100 may include a processor 130, a memory 140, and/or an interface 150. According to an embodiment, the electronic device 100 may omit at least one of the components or add one or more other components.

The processor 130 may execute, for example, software (e.g., a program) to control at least one other component (e.g., a hardware or software component) of the electronic device 100 coupled with the processor 130, and may perform various data processing or computation. According to an embodiment, as at least part of the data processing or computation, the processor 130 may store a command or data received from another component (e.g., the sensor module or communication module) onto a volatile memory, process the command or the data stored in the volatile memory, and store resulting data in a non-volatile memory. According to an embodiment, the processor may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 100 includes the main processor and the auxiliary processor, the auxiliary processor may be configured to use lower power than the main processor or to be specified for a designated function. The auxiliary processor may be implemented as separate from, or as part of the main processor. The auxiliary processor may control at least some of functions or states related to at least one component (e.g., display module, sensor module, or communication module) of the electronic device 100, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another component (e.g., the camera module or the communication module) functionally related to the auxiliary processor.

The processor 130 may include a touch IC (e.g., touch circuit) 131 to perform data processing or computation based on the signal input to the touch panel and control the touch panel and a charging IC 132 to perform data processing or computation based on the charging signal (e.g., pen tip signal) of the pen-type input device and control the wireless charging pad, as auxiliary processors. Further, according to an embodiment, the processor 130 may further include an analog front end (AFE) 133 to receive the charging noise signal and correct the frequency to avoid charging noise and a micro controller unit (MCU) 134, as auxiliary processors. According to an embodiment, some (touch IC 131, analog front end (AFE) 133, and micro controller unit (MCU) 134) among the auxiliary processors may be integrated into a single component (e.g., touch IC 131).

The memory 140 may store various data used by at least one component (e.g., the processor 130) of the electronic device 100. The various data may include, for example, software (e.g., the program) and input data or output data for a command related thereto. The memory 140 may include a volatile memory or a non-volatile memory.

The interface 150 may include, e.g., a high definition multimedia interface (HDMI), a universal serial bus (USB) interface, a secure digital (SD) card interface, and/or an audio interface. The interface may electrically or physically connect, e.g., the electronic device 100 with an external electronic device and may include a USB connector, an SD card/multimedia card (MMC) connector, or an audio connector.

Figure 5:
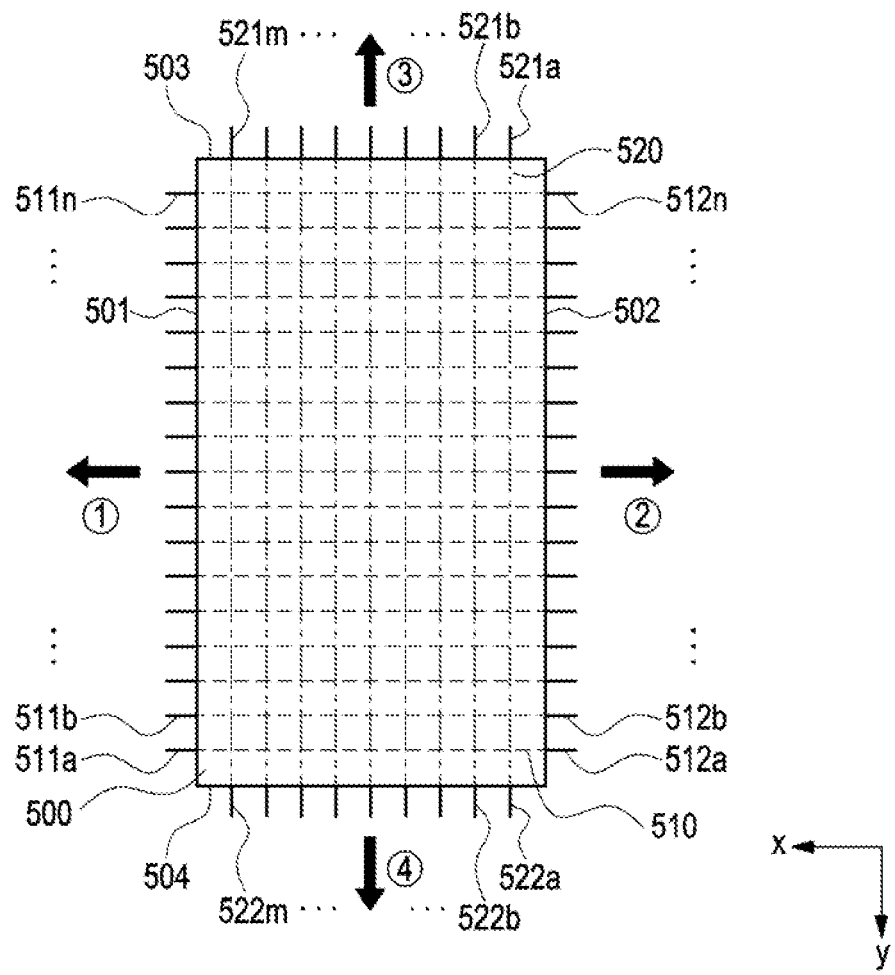
FIG. 5 is a view illustrating conductive lines formed on a touch panel in an electronic device according to various embodiments of the disclosure.

FIG. 5 is a view illustrating conductive patterns 510 and 520 and conductive traces 511, 512, 521, and 522 formed on a touch panel 500 according to various embodiments of the disclosure.

The electronic device 100 may detect an input on the surface of the display 101 by using the touch panel 500. Here, the input recognizable by the touch panel 500 may include not only an input through direct contact with the surface of the display 101, but also an input through hovering. According to an embodiment, the touch panel 500 may be formed to have substantially the same area as the display 101, and may be disposed adjacent to the display 101. According to various embodiments, the touch panel 500 may be disposed on the upper surface or the rear surface of the display 101.

According to various embodiments, as the touch panel 500, touch panels in various schemes may be included. For example, touch panels in various schemes, such as a capacitive touch panel that detects changes in capacitance, a resistive touch panel that detects the position by detecting the pressure on the panel, an optical touch panel using infrared rays, and a transparent electrode type touch panel that uses contact points of a transparent conductive film, may be used. Other input position detection panels not mentioned, such as a touch panel in an electromagnetic resonance (hereinafter, EMR) scheme, may be used.

The touch panel 500 may include four sides facing in different directions. For example, the touch panel 500 may include a first side 501 facing in a first direction ①, a second side 502 facing in a second direction ②, a third side 503 facing in a third direction ③, and a fourth side 504 facing in a fourth direction ④. The touch panel 500 may be formed as a substantially rectangular flat plate. Accordingly, the second direction may be opposite to the first direction, and the fourth direction may be opposite to the third direction. The first direction and the second direction may be parallel to a width direction of the electronic device. The third direction and the fourth direction may be parallel to a length direction of the electronic device. Further, the first direction and the third direction may be substantially orthogonal to each other.

The touch panel 500 may include a first pattern 510 extending in the first or second direction and a second pattern 520 extending in the third or fourth direction, as conductive patterns. The first pattern 510 and the second pattern 520 may be substantially perpendicular to each other. The first pattern 510 may include a plurality of first patterns formed on the touch panel 500 in parallel in the first direction or the second direction. The second pattern 520 may include a plurality of second patterns formed on the touch panel 500 in parallel in the third direction or the fourth direction.

According to an embodiment, the first pattern 510 may be a pattern for indicating the X-axis coordinate of the touch panel 500, and the second pattern 520 may be a pattern for indicating the Y-axis coordinate of the touch panel 500. The XY coordinate system of the touch panel 500 may be formed using the first pattern 510 and the second pattern 520. According to an embodiment, a transmission pattern (e.g., Tx pattern) and a reception pattern (e.g., Rx pattern) may be formed by combining these patterns. For example, the first pattern 510 may form a transmission pattern (e.g., Tx pattern), and the second pattern 520 may form a reception pattern (e.g., Rx pattern). Alternatively, the first pattern 510 may form a reception pattern (e.g., Rx pattern), and the second pattern 520 may form a transmission pattern (e.g., Tx pattern).

The first pattern 510 and the second pattern 520 of the touch panel 500 each may be electrically connected to a touch IC (e.g., the touch IC 131 of FIG. 4B) included in the electronic device 100. According to an embodiment, the touch panel 500 may include a pattern layer where the transmission pattern (e.g., Tx pattern) is formed and a pattern layer where the reception pattern (e.g., Rx pattern) is formed. The transmission pattern layer and the reception pattern layer are stacked on each other, and the patterns included on the pattern layer are electrically connected to the touch IC (e.g., the touch IC 131 of FIG. 4B) to generate/detect an electromagnetic field. According to an embodiment, the magnetic field generated from an electromagnetic inductor (e.g., the pen-type input device 120) may be detected through the electromagnetic resonance (hereinafter, EMR) scheme using the touch panel 500, and various inputs, such as the approach, click, or drag of the electromagnetic inductor, may be detected.

The first pattern 510 may extend from the first side 501 and/or the second side 502 of the touch panel 500 to be connected to the touch IC (e.g., the touch IC 131 of FIG. 4B). For example, the first pattern 510 may include a 1-1th conductive trace 511 extending from the first side 501 and connected to the touch IC (e.g., the touch IC 131 of FIG. 4B) and may additionally or alternatively include a 1-2th conductive trace 512 extending from the second side 502 and connected to the touch IC (e.g., the touch IC 131 of FIG. 4B). As another example, the second pattern 520 may include a 2-1th conductive trace 521 extending from the third side 503 and connected to the touch IC (e.g., the touch IC 131 of FIG. 4B) and may additionally or alternatively include a 2-2th conductive trace 522 extending from the fourth side 504 and connected to the touch IC.

Due to the spatial limitation of the component mounting space in the electronic device 100, only either the 1-1th conductive trace 511 or the 1-2th conductive trace 512 may be connected to the touch IC (e.g., the touch IC of FIG. 4B), or only either the 2-1th conductive trace 521 or the 2-2th conductive trace 522 may be connected to the touch IC (e.g., the touch IC 131 of FIG. 4B), forming a single routing structure. In contrast, when a component mounting space is secured, the 1-1th conductive trace 511 and the 1-2th conductive trace 512 together may be connected to the touch IC (e.g., the touch IC 131 of FIG. 4B), or the 2-1th conductive trace 521 and the 2-2th conductive trace 522 together may be connected to the touch IC (e.g., the touch IC 131 of FIG. 4B), forming a double routing structure.

A plurality of 1-1th conductive traces 511 and a plurality of 1-2th conductive traces 512 may be formed to correspond to the first pattern 510 in the touch panel 500. For example, the 1-1th conductive trace 511 and the 1-2th conductive trace 512 may include n conductive traces formed in parallel in the first direction or the second direction. A plurality of 2-1th conductive traces 521 and a plurality of 2-2th conductive traces 522 may be formed to correspond to the second pattern 520 in the touch panel 500. For example, the 2-1th conductive trace 521 and the 2-2th conductive trace 522 may include m conductive traces formed in parallel in the third direction or the fourth direction.

Figure 6:
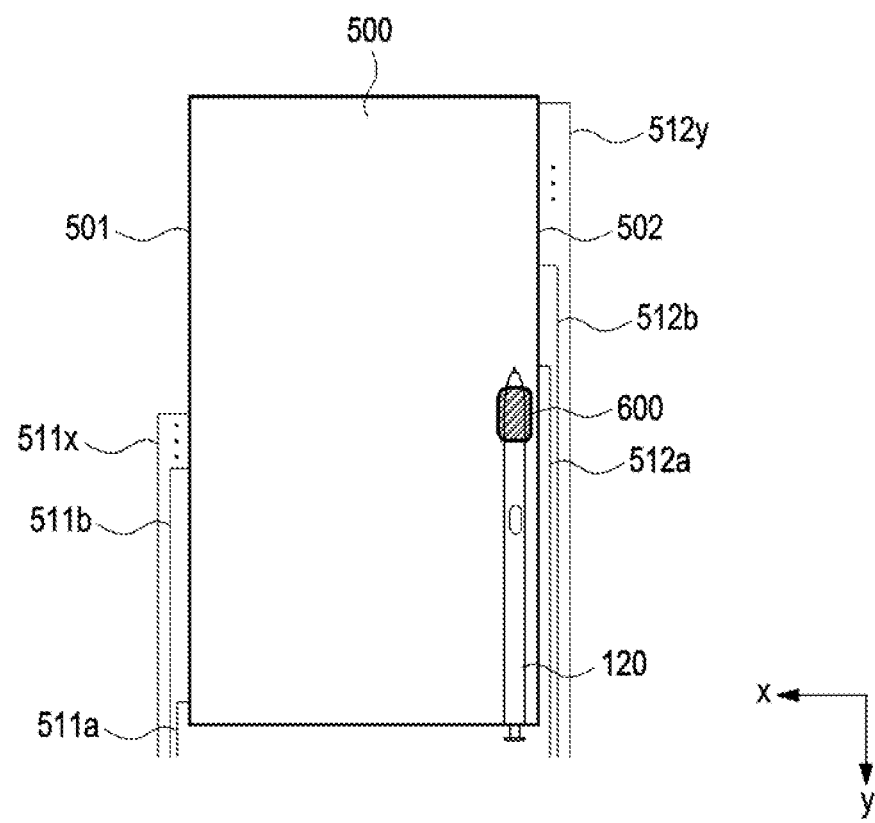
FIG. 6 is a view schematically illustrating positions of a touch panel and a pen-type input device in an electronic device according to an embodiment.

FIG. 6 is a view schematically illustrating positions of a touch panel 500 and a pen-type input device 120 in an electronic device according to an embodiment. FIG. 6 may represent the positional relationship between the pen-type input device 120 and the touch panel 500 when the pen-type input device is inserted into the receiving space (e.g., the receiving space 122 of FIG. 4A) of the electronic device.

For component mountability and efficient use of space in the electronic device, the receiving space (e.g., the receiving space 122 of FIG. 4A) may typically be formed adjacent to one side surface of the electronic device. Accordingly, when the pen-type input device 120 is inserted into the receiving space (e.g., the receiving space 122 of FIG. 4A), the pen-type input device 120 may be received in a position adjacent to one side surface of the electronic device.

The electronic device may include a wireless charging pad 600 for wireless charging of the pen-type input device. The wireless charging pad 600 may be disposed in the position corresponding to the position of the wireless charging coil included in the pen-type input device 120 when the pen-type input device is fixed in the inserted position in the receiving space (e.g., the receiving space 122 of FIG. 4A), in the internal space of the electronic device. According to an embodiment, the wireless charging pad 600 may include a ferrite core and a coil. According to an embodiment, the wireless charging pad 600 may include a coil disposed on the upper side of the surface member in a predetermined pattern.

FIG. 6 illustrates a plurality of 1-1th conductive traces 511*a*, 511*b*, . . . , 511*x* and a plurality of 1-2th conductive traces 512*a*, 512*b*, . . . , 512*y* extending from the first side 501 or the second side 502 and connected with the first pattern (e.g., the first pattern 510 of FIG. 5) of the touch panel 500. The plurality of 1-1th conductive traces 511*a*, 511*b*, . . . , 511*x* and the plurality of 1-2th conductive traces 512*a*, 512*b*, . . . , 512*y* extending from the first side 501 or the second side 502 may be electrically connected to the touch IC (e.g., the touch IC 131 of FIG. 4B) included in the electronic device. FIG. 6 illustrates that first ends of the plurality of 1-1th conductive traces 511*a*, 511*b*, . . . , 511*x* and the plurality of 1-2th conductive traces 512*a*, 512*b*, . . . , 512*y* extend from the first side 501 and the second side 502 of the touch panel 500, and the second ends thereof extend towards a lower end of the touch panel 500, but this is merely for convenience of description, and is not necessarily limited thereto. It should be noted that the second ends of the 1-1th conductive traces 511*a*, 511*b*, . . . , 511*x* and the plurality of 1-2th conductive traces 512*a*, 512*b*, . . . , 512*y* may extend in various directions corresponding to the position of the touch IC (e.g., the touch IC 131). Here, the sum x+y of the number x of the 1-1th conductive traces 511*a*, 511*b*, . . . , 511*x* and the number y of the 1-2th conductive traces 512*a*, 512*b*, . . . , 512*y* may be n.

According to an embodiment, when the pen-type input device 120 is disposed adjacent to the second side 502 as shown in FIG. 6, and the plurality of 1-1th conductive traces 511*a*, 511*b*, . . . , 511*x* extend from the first side 501, and the plurality of 1-2th conductive traces 512*a*, 512*b*, . . . , 512*y* extend from the second side 502, the performance of touch input using the touch panel 500 may be deteriorated due to the wireless charging operation of the pen-type input device 120.

Figure 7:
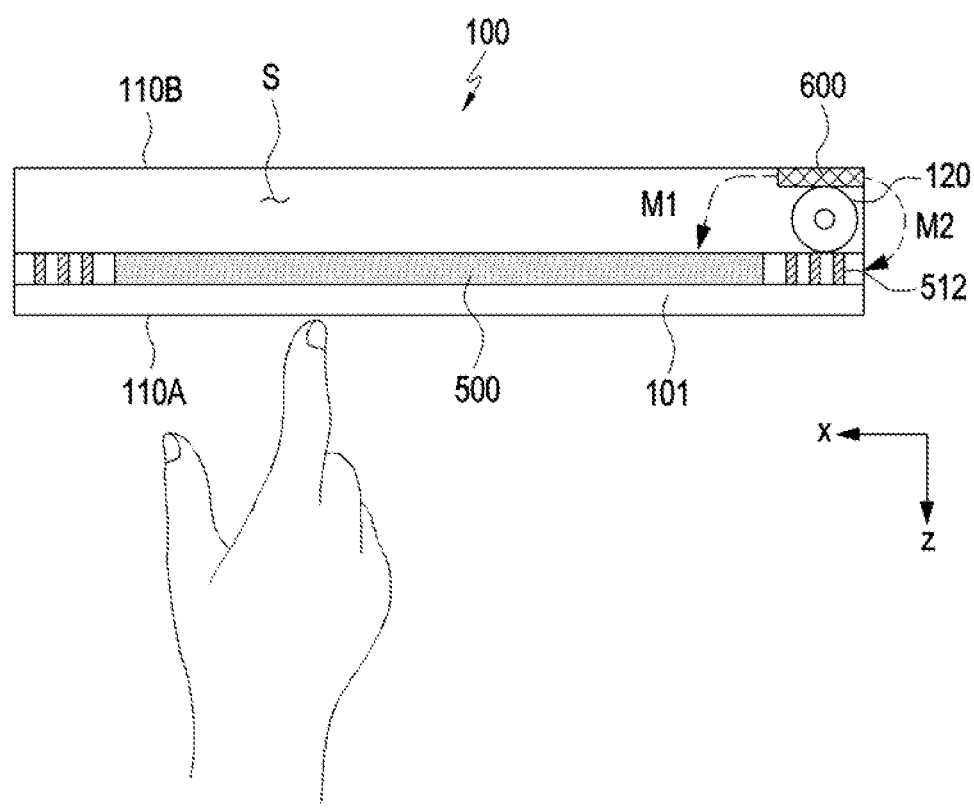
FIG. 7 is a view schematically illustrating a cross section of an electronic device including a touch panel, a pen-type input device, and a wireless charging pad according to various embodiments.

FIG. 7 is a view schematically illustrating a cross section of an electronic device 100 including a touch panel 500, a pen-type input device 120, and a wireless charging pad 600 according to various embodiments.

Referring to FIG. 7, in the electronic device 100, the pen-type input device 120 may be disposed in the position adjacent to one side (e.g., the second side 502) of the touch panel 500. The electronic device 100 may include the wireless charging pad 600 disposed in a position corresponding to the wireless charging coil of the pen-type input device 120 for wireless charging of the pen-type input device 120.

If the pen-type input device 120 is mounted in the receiving space of the electronic device 100 and is thus in the 'pen inserted' state, the processor (not shown) included in the electronic device or the charging IC (e.g., the charging IC 132 of FIG. 4B) may recognize the 'pen inserted' state of the pen-type input device 120 to implement a wireless power transmission function from the wireless charging pad 600 to the pen-type input device 120.

According to various embodiments, the electronic device 100 may recognize the attached/detached state of the pen-type input device 120. The electronic device 100 may detect the attached/detached state of the pen-type input device 120 using the wireless charging pad 600 and/or a sensor. According to an embodiment, a magnetic field signal (e.g., a resonance signal or an induced magnetic field signal) may be generated between the coil of the wireless charging pad 600 and the wireless charging coil of the pen-type input device 120, and the electronic device 100 may detect the attached/detached state of the pen-type input device 120 based on a change in the magnetic field signal. In an embodiment, when the pen-type input device 120 is inserted (or attached) to the electronic device 100, the electronic device 100 may receive an electrical signal of a threshold voltage or more through the generation of the induced magnetic field, and the electronic device 100 may determine the 'pen inserted' state of the pen-type input device 120 based on the received electrical signal. When an electrical signal of a threshold voltage or more is generated through the wireless charging pad 600, the electronic device 100 may recognize that the pen-type input device 120 is in the inserted (or attached) state.

According to an embodiment, in a state in which the pen-type input device 120 is inserted (or attached) to the electronic device 100, the electronic device 100 and the pen-type input device 120 may continuously transmit/receive communication signals including charging power and data. Meanwhile, when an electrical signal of the threshold voltage or more is not received through the coil of the wireless charging pad 600, the pen-type input device 120 may be recognized as being in the detached (or removed) state.

According to an embodiment, the electronic device 100 may detect the inserting (or attaching) operation for the pen-type input device 120 and, when the pen-type input device 120 is inserted (or attached) to the electronic device 100, execute the charging operation of the pen-type input device 120 by using the wireless charging pad 600. According to an embodiment, the electronic device 100 may supply power to the pen-type input device 120 through the induced magnetic field generated from the wireless charging pad 600 and the pen-type input device 120.

According to an embodiment, the electronic device 100 may detect the attached/detached state of the pen-type input device 120 based on the sensing data from the detection sensor, such as a hall sensor. The pen-type input device 120 and the wireless charging pad 600 may be coupled to each other by an electromagnetic induction or resonance scheme and influence the touch input of the electronic device 100 by the magnetic field induced by the wireless charging operation. For example, a first magnetic field M1 and a second magnetic field M2 may be generated from the wireless charging pad 600. The first magnetic field M1 towards the rear surface of the touch panel 500 may have little influence on the touch panel due to the structure or shielder in the space(S) of the electronic device 100 while the second magnetic field M2 towards a side of the touch panel 500, i.e., the conductive traces, may affect the signal flow of the conductive traces adjacent to the pen-type input device 120 to deteriorate the touch input performance.

Figure 8:
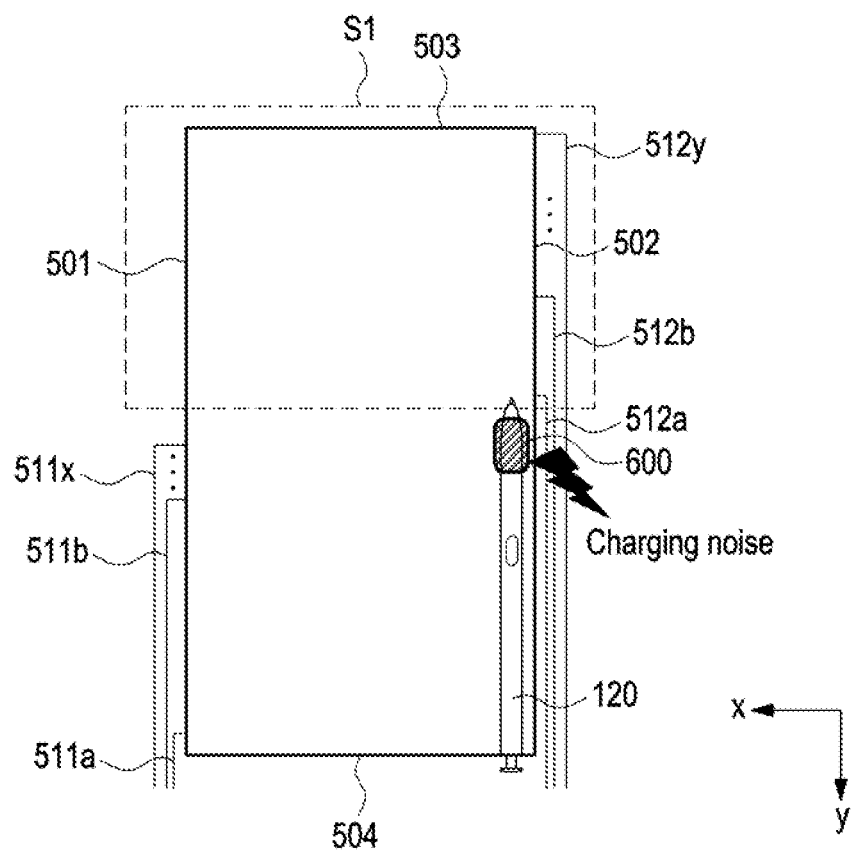
FIG. 8 is a view schematically illustrating conductive traces influenced by a magnetic field generated from a wireless charging pad in an electronic device according to an embodiment.
Figure 9:
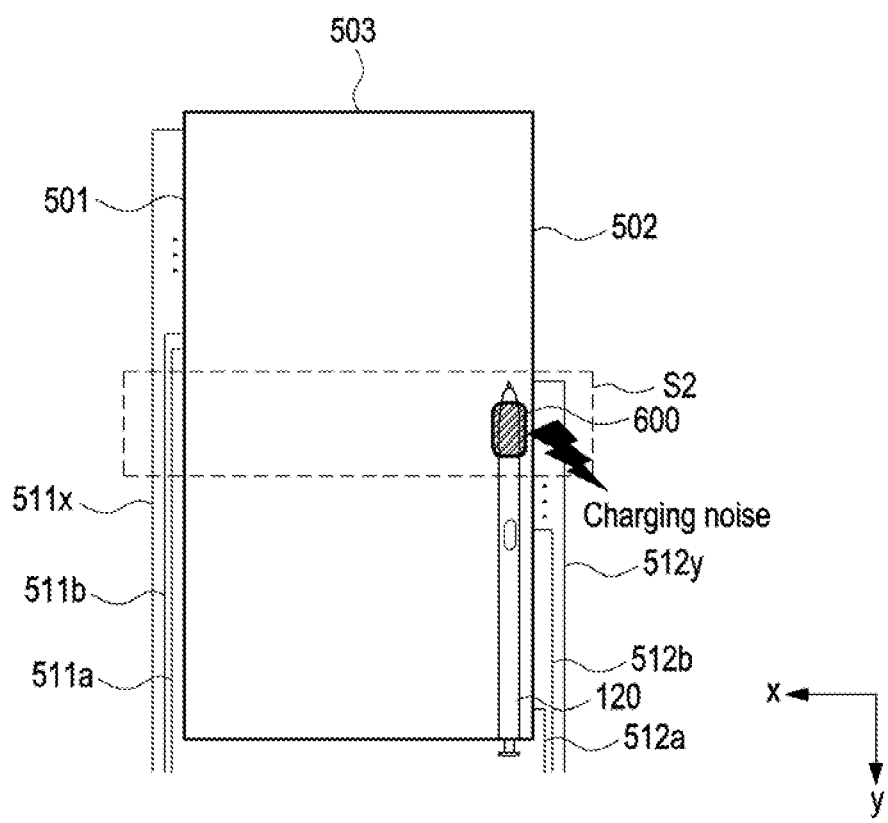
FIG. 9 is a view schematically illustrating conductive traces influenced by a magnetic field generated from a wireless charging pad in an electronic device according to an embodiment different from the embodiment of FIG. 8.

FIG. 8 is a view schematically illustrating conductive traces influenced by a magnetic field generated from a wireless charging pad 600 in an electronic device according to an embodiment. FIG. 9 is a view schematically illustrating conductive traces influenced by a magnetic field generated from a wireless charging pad 600 in an electronic device according to an embodiment different from that of FIG. 8.

Referring to FIG. 8, the plurality of 1-1th conductive traces 511*a*, 511*b*, . . . , 511*x* and the plurality of 1-2th conductive traces 512*a*, 512*b*, . . . , 512*y* described above in FIG. 6 are shown. The plurality of 1-1th conductive traces 511*a*, 511*b*, . . . , 511*x* extending from the first side 501 and the plurality of 1-2th conductive traces 512*a*, 512*b*, . . . , 512*y* extending from the second side 502 may be electrically connected to the touch IC (e.g., the touch IC 131 of FIG. 4B) included in the electronic device. According to an embodiment, the plurality of 1-1th conductive traces 511a, 511b, . . . , 511x and the plurality of 1-2th conductive traces 512a, 512b, . . . , 512y each may be connected to the touch IC (e.g., the touch IC 131 of FIG. 4B) in a single routing structure. The first ends of the plurality of 1-1th conductive traces 511a, 511b, . . . , 511x and the plurality of 1-2th conductive traces 512a, 512b, . . . , 512y may extend from the first side 501 and second side 502 of the touch panel 500, and the second ends thereof may extend towards the lower end of the touch panel 500.

In the embodiment of FIG. 8, the pen-type input device 120 may be positioned on the second side 502 of the touch panel 500. According to an embodiment, the pen-type input device 120 may be disposed in parallel and adjacent to the second side 502, while being inserted in the electronic device 100 through the fourth side 504 of the touch panel 500. The wireless charging pad 600 of the electronic device 100 may be disposed in the position corresponding to the wireless charging coil, positioned in, e.g., the pen tip of the pen-type input device 120.

In the embodiment shown in FIG. 8, the plurality of 1-1th conductive traces 511a, 511b, . . . , 511x are spaced apart from the second side 502 adjacent to the pen-type input device 120 by a considerable distance and, thus, may not be affected by the magnetic field generated from the pen-type input device 120. In contrast, since the plurality of 1-2th conductive traces 512a, 512b, . . . , 512y extend along the second side 502 adjacent to the pen-type input device 120, and at least a portion of the 1-2th conductive traces 512a, 512b, . . . , 512y extend close to the wireless charging coil of the pen-type input device 120 and the wireless charging pad 600 of the electronic device 100, they may be affected by the magnetic field generated from the wireless charging pad 600. According to an embodiment, a touch input to the first pattern areas S1 in the touch panel 500 connected to the 1-2th conductive traces 512a, 512b, . . . , 512y may not be smoothly implemented.

Referring to FIG. 9, the plurality of 1-1th conductive traces 511a, 511b, . . . , 511x and the plurality of 1-2th conductive traces 512a, 512b, . . . , 512y are shown. The plurality of 1-1th conductive traces 511a, 511b, . . . , 511x extending from the first side 501 and the plurality of 1-2th conductive traces 512a, 512b, . . . , 512y extending from the second side 502 may be electrically connected to the touch IC (e.g., the touch IC 131 of FIG. 4B) included in the electronic device. Also in the embodiment shown in FIG. 9, the plurality of 1-1th conductive traces 511a, 511b, . . . , 511x and the plurality of 1-2th conductive traces 512a, 512b, . . . , 512y each may be connected to the touch IC (e.g., the touch IC 131 of FIG. 4B) in a single routing structure. As a difference from the embodiment shown in FIG. 8, the plurality of 1-1th conductive traces 511a, 511b, . . . , 511x shown in FIG. 9 are formed in the upper area of the first side 501 side, and the plurality of 1-2th conductive traces 512a, 512b, . . . , 512y are formed in the lower area of the second side 502 side.

In the embodiment shown in FIG. 9, like in the embodiment shown in FIG. 8, the plurality of 1-1th conductive traces 511a, 511b, . . . , 511x are spaced apart from the second side 502 adjacent to the pen-type input device 120 by a considerable distance and, thus, may not be affected by the magnetic field generated from the pen-type input device 120. Referring to the plurality of 1-2th conductive traces 512a, 512b, . . . , 512y, some of the plurality of 1-2th conductive traces 512a, 512b, . . . 512y are formed in the lower (e.g., −y direction) area of the touch panel 500 and thus be very little affected by the magnetic field generated from the wireless charging pad 600. However, since a portion of at least one 1-2th conductive trace 512y among the plurality of 1-2th conductive traces 512a, 512b, . . . , 512y extends close to the wireless charging coil of the pen-type input device 120 and the wireless charging pad 600 of the electronic device 100, it may be affected by the magnetic field generated from the wireless charging pad 600. According to an embodiment, a touch input to the second pattern areas S2 in the touch panel 500 connected to the 1-2th conductive trace 512y may not be smoothly implemented.

Figure 10:
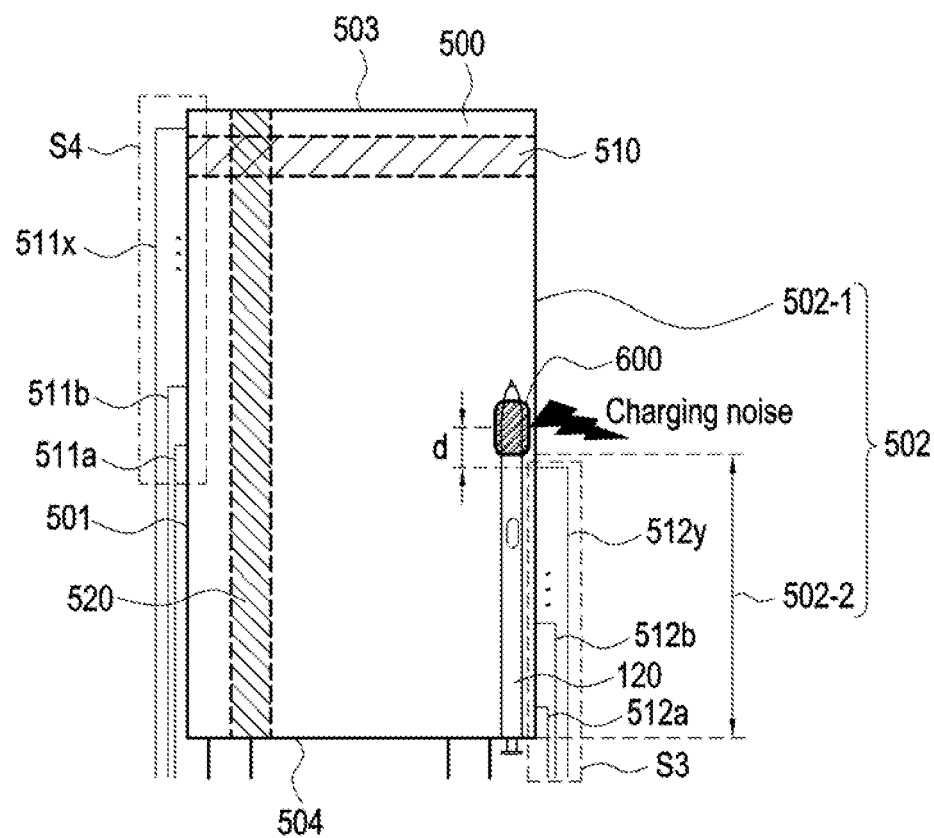
FIG. 10 is a view schematically illustrating an electronic device including conductive traces disposed to avoid charging noise of a wireless charging pad according to various embodiments of the disclosure.

FIG. 10 is a view schematically illustrating an electronic device including conductive traces disposed to avoid charging noise of a wireless charging pad according to various embodiments of the disclosure.

Referring to FIG. 10, according to various embodiments of the disclosure, the electronic device 100 may include a plurality of 1-1th conductive traces 511a, 511b, . . . , 511x extending from the first side 501 and a plurality of 1-2th conductive traces 512a, 512b, . . . , 512y extending from the second side 502, and such conductive traces may be electrically connected to the first pattern 510 of the touch panel 500. The electronic device 100 also includes a plurality of conductive traces connected to the second pattern 520, which are, however, omitted from the illustration of FIG. 10.

To avoid the charging noise of the wireless charging pad, the plurality of 1-1th conductive traces 511a, 511b, . . . , 511x may be formed on the other side (e.g., the first side 501) facing in the direction opposite to the one side (e.g., the second side 502) of the touch panel 500 where the pen-type input device 120 and the wireless charging pad 600 are disposed. It may be most preferable to form all of the plurality of conductive traces formed on the touch panel 500 on the other side (e.g., the first side 501) facing in the direction opposite to the one side (e.g., the second side 502) of the touch panel 500 where the pen-type input device 120 and the wireless charging pad 600 are disposed. However, the plurality of conductive traces may be required to be distributed on the one side and the other side of the touch panel 500 in view of downsizing of the electronic device, shrinking of the non-display area (e.g., BM area) and/or the mountability of electronic components. Accordingly, to arrange a plurality of conductive traces (e.g., the plurality of 1-2th conductive traces 512a, 512b, . . . , 512y) on one side (e.g., the second side 502) of the touch panel 500, a design to get around the wireless charging pad 600 may be required.

According to various embodiments of the disclosure, since the plurality of 1-2th conductive traces 512a, 512b, . . . , 512y may be affected by charging noise caused by the magnetic force generated between the wireless charging pad 600 and the pen-type input device 120 positioned on the second side 502 of the touch panel 500, the plurality of 1-2th conductive traces 512a, 512b, . . . , 512y may be formed to be spaced apart from the wireless charging pad to avoid such influence. Further, the plurality of 1-2th conductive traces 512a, 512b, . . . , 512y may extend in a direction away from the wireless charging pad 600. For example, the third pattern area S3 in the touch panel 500 connected to the plurality of 1-2th conductive traces 512a, 512b, . . . , 512y may be formed in an area that does not overlap with the wireless charging pad 600.

Comparing the embodiment shown in FIG. 10 with the embodiment shown in FIGS. 8 and 9, the plurality of 1-2th conductive traces 512a, 512b, . . . , 512y may be disposed in the section 502-2 with no or minimized interference by the wireless charging pad 600, rather than the section 502-1 interfered by the wireless charging pad 600. Assuming that other conditions are the same, the positions of the plurality of 1-2th conductive traces 512*a*, 512*b*, . . . , 512*y* shown in FIG. 10 may be formed far away from the wireless charging pad as compared with the positions of the 1-2th conductive traces shown 512*a*, 512*b*, . . . , 512*y* shown in FIGS. 8 and 9. According to an embodiment, the plurality of 1-1th conductive traces 511*a*, 511*b*, . . . , 511*x* shown in FIG. 10 may be disposed to cover a wider area of the touch panel 500 than the 1-1th conductive traces 511*a*, 511*b*, . . . , 511*x* shown in FIGS. 8 and 9. For example, the fourth pattern area S4 of the touch panel 500 connected to the 1-1th conductive traces 511*a*, 511*b*, . . . , 511*x* may have a wider area than those of FIGS. 8 and 9.

The above-described design of the plurality of 1-1th conductive traces 511*a*, 511*b*, . . . , 511*x* and the plurality of 1-1th conductive traces 511*a*, 511*b*, . . . , 511*x* for avoiding charging noise of the wireless charging pad is based on the connection with the first pattern 510, but may also be applied to the second pattern 520 in a similar manner.

Figure 11:
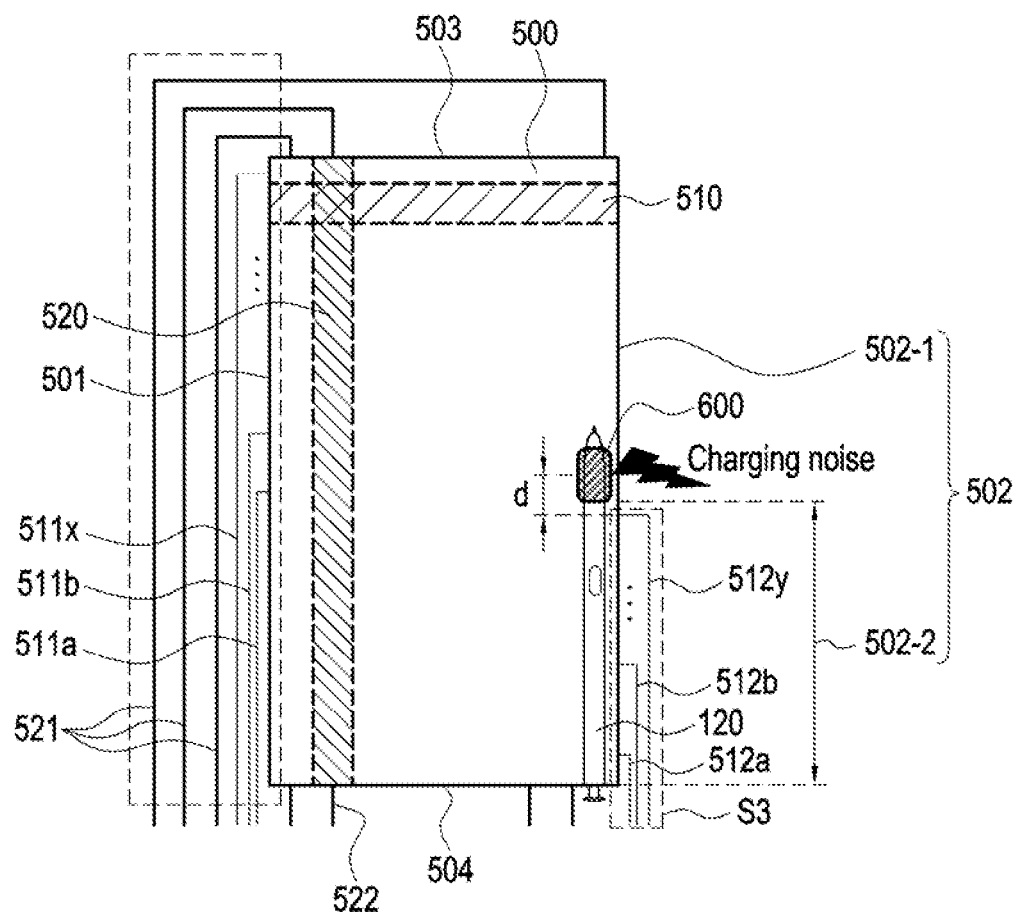
FIG. 11 is a view schematically illustrating an electronic device including conductive traces disposed to avoid charging noise of a wireless charging pad according to an embodiment different from the embodiment of FIG. 10.

FIG. 11 is a view schematically illustrating an electronic device including conductive traces disposed to avoid charging noise of a wireless charging pad according to an embodiment different from that of FIG. 10. FIG. 10 illustrates that the conductive traces connected to the second pattern 520 are connected to the touch IC (e.g., the touch IC 131 of FIG. 4B) in a single routing structure, whereas FIG. 11 illustrates that the conductive traces connected to the second pattern 520 are connected to the touch IC (e.g., the touch IC 131 of FIG. 4B) in a double routing structure.

Referring back to FIG. 10, when the conductive traces connected to the second pattern 520 are connected to the touch IC (e.g., the touch IC 131 of FIG. 4B) in a single routing structure, the plurality of conductive traces may extend in a direction away from the wireless charging pad 600, from one side (e.g., 504) of the touch panel 500.

Unlike this, in a double routing structure in which the conductive traces extend from one side (e.g., 504) and the other side (e.g., 503) of the touch panel 500 to connect to the touch IC (e.g., the touch IC 131 of FIG. 4B) as shown in FIG. 11, the plurality of conductive traces may be required to extend in the direction far away from the wireless charging pad 600 from the one side (e.g., 504) of the touch panel 500 and extend from the other side (e.g., 503) to connect to the touch IC (e.g., the touch IC 131 of FIG. 4B).

According to various embodiments of the disclosure, in this case, the plurality of conductive traces extending from the other side 503 of the touch panel 500 are configured to extend around the other side (e.g., 501) facing in the opposite direction to the side (e.g., 502) which the wireless charging pad 600 of the touch panel 500 is disposed adjacent to, thereby avoiding charging noise.

Figure 12:
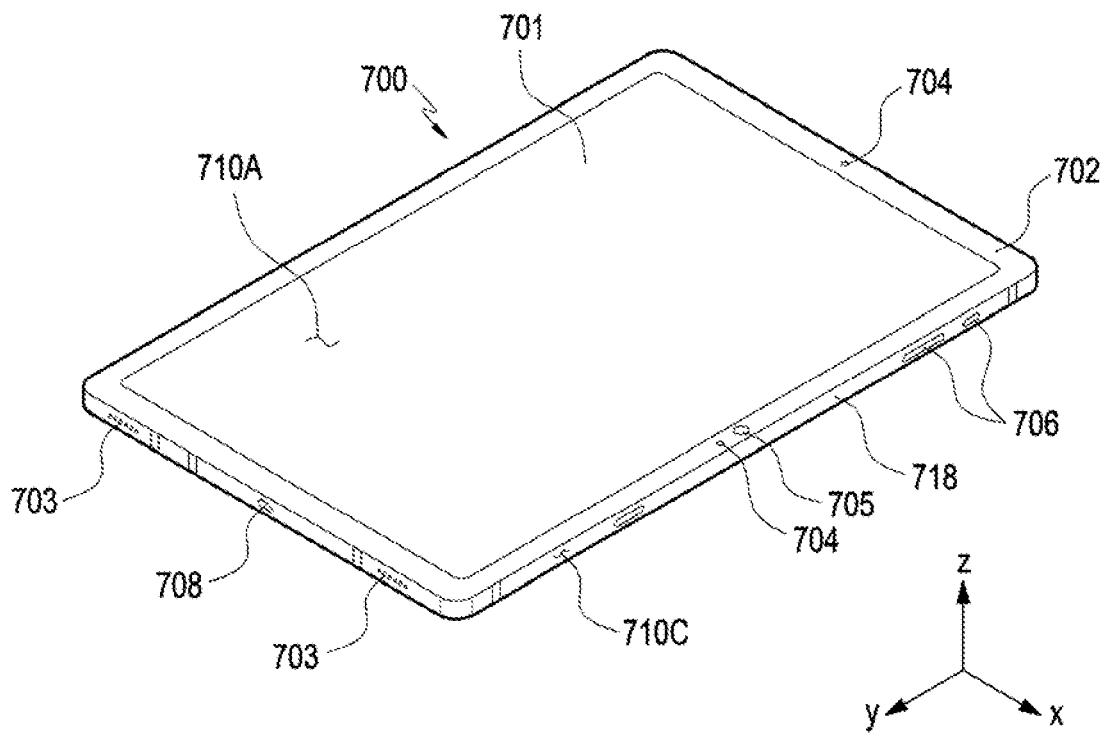
FIG. 12 is a perspective view illustrating an electronic device according to an embodiment different from the embodiment of FIG. 1.
Figure 13:
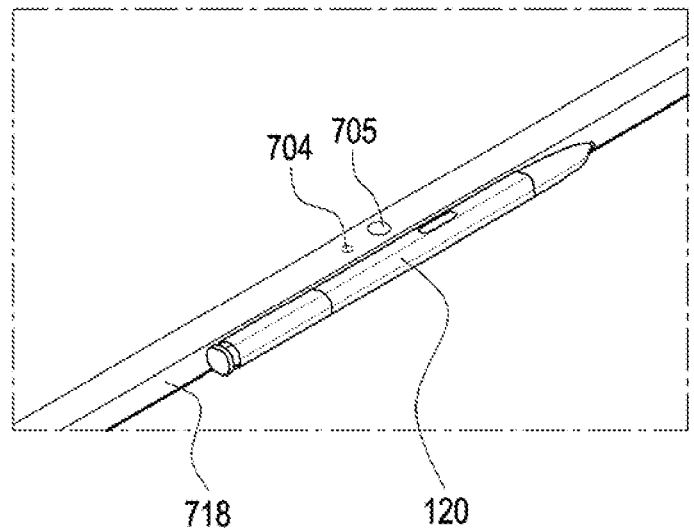
FIG. 13 is a view illustrating an example in which a pen-type input device is attached to an electronic device according to the embodiment shown in FIG. 12.
Figure 14:
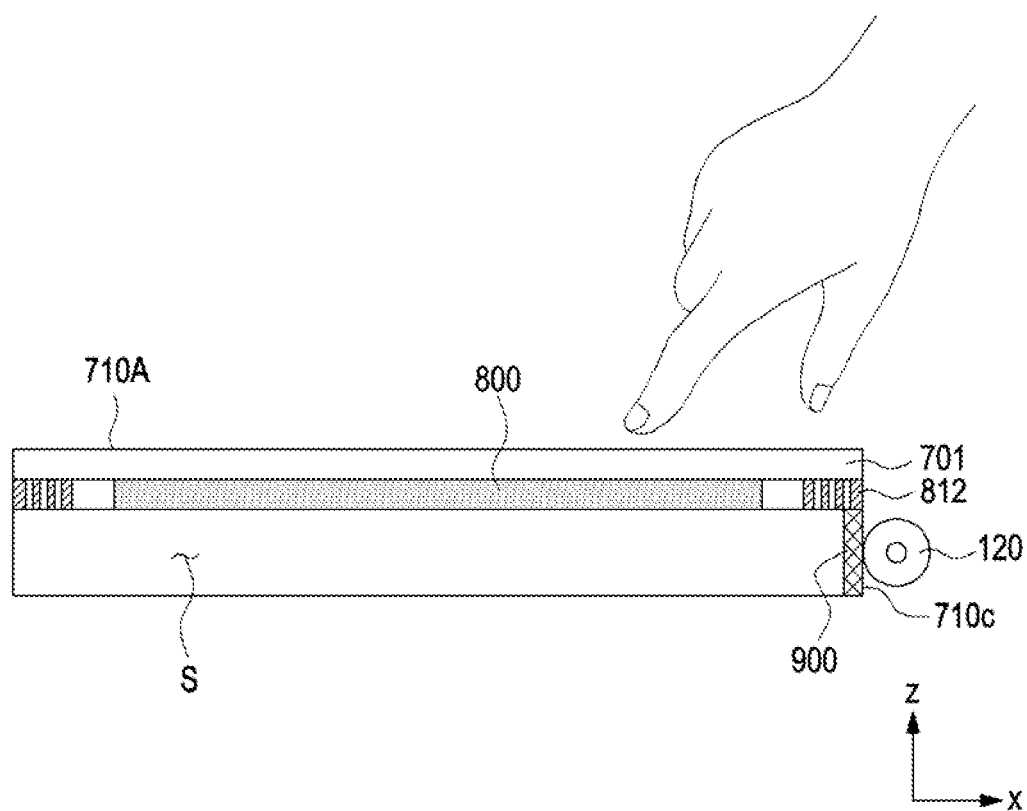
FIG. 14 is a view schematically illustrating a cross section of an electronic device including a touch panel and a wireless charging pad according to the embodiment shown in FIG. 12.

FIG. 12 is a perspective view illustrating an electronic device 700 according to an embodiment different from the embodiment of FIG. 1. FIG. 13 is a view illustrating an example in which a pen-type input device 120 is attached to an electronic device 700 according to the embodiment shown in FIG. 12. FIG. 14 is a view schematically illustrating a cross section of an electronic device including a touch panel 800 and a wireless charging pad 900 according to the embodiment shown in FIG. 12.

Referring to FIG. 12, according to an embodiment, the electronic device 700 may include a housing including a first surface (or front surface) 710A, a second surface (or rear surface), and a side surface 710C surrounding a space between the first surface 710A and the second surface. According to an embodiment, the first surface 710A may be formed by a first plate 702, at least a portion of which is substantially transparent. The second surface may be formed by a substantially opaque second plate. The side surface 710C may be formed by a side member 718 that is coupled to the front plate 702 and the rear plate 211 and includes a metal and/or polymer. The electronic device 700 may include at least one or more of a display 701, an audio module 704, a camera module 705, a key input device 706, and a connector hole 708. According to an embodiment, the electronic device 700 may exclude at least one (e.g., the key input device 706) of the components or may add other components.

The electronic device 700 according to the embodiment shown in FIG. 12 may have a wider display screen than the electronic device 100 according to the embodiment shown in FIG. 1.

Referring to FIG. 13, in the electronic device 700, the pen-type input device 120 may be detachably formed outside the electronic device 700 instead of being received in the internal space of the electronic device 700. For example, the pen-type input device 120 may be attached to at least a portion of the side surface 710C of the electronic device 700 in a direction parallel to the length direction (e.g., a direction parallel to the y-axis) of the electronic device 700. In this case, the pen-type input device 120 may be fixedly disposed on one side surface 710C of the electronic device 700 by a magnetic substance (not shown) disposed inside the electronic device 700.

The electronic device 700 according to the embodiment shown in FIGS. 12 and 13 may also be formed to be capable of receiving input using the pen-type input device 120 and may be formed to be capable of a wireless charging function for the pen-type input device 700.

Referring to FIG. 14, the electronic device 700 may include a touch panel 800 in the space(S) therein to enable input using the pen-type input device 120 and may further include a wireless charging pad 900 to enable a wireless charging operation for the pen-type input device 120. Further, the touch panel 800 may further include a plurality of conductive traces 812 electrically connected to the touch IC (e.g., the touch IC 131 of FIG. 4B).

Referring to FIGS. 12 to 14 together, the plurality of conductive traces 812 connected to the edge of the touch panel 800 may be affected by the charging noise generated during the wireless charging operation between the electronic device 700 and the pen-type input device 120, so that the touch input function may be deteriorated. For example, transmission/reception of the touch signal through the plurality of conductive traces 812 may not be smoothly achieved by the magnetic field formed between the wireless charging pad 900 and the pen-type input device 120 attached to the side surface 710C of the electronic device 700.

To prevent the deterioration of the touch input function, the charging noise avoidance configuration of the plurality of conductive traces of FIGS. 10 and 11 described above may be applied to the electronic device 700 according to the embodiments shown in FIGS. 12 to 14.

Figure 15:
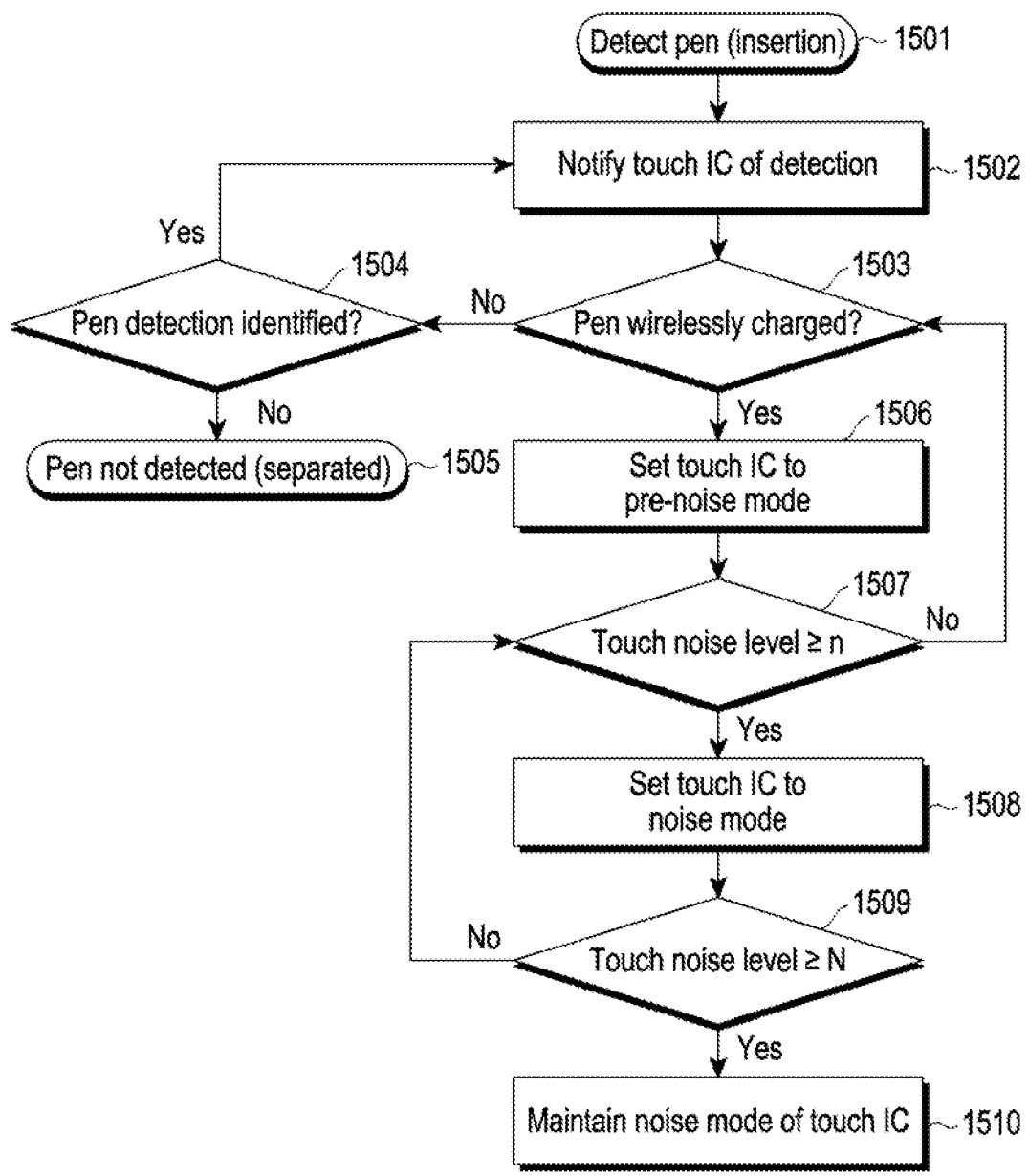
FIG. 15 is a flowchart illustrating an operation method of an electronic device to avoid charging noise according to various embodiments of the disclosure.

FIG. 15 is a flowchart illustrating an operation method of an electronic device to avoid charging noise according to various embodiments of the disclosure.

According to an embodiment, there may be provided a charging noise avoidance method using an operation algorithm of the processor or the touch IC (e.g., the touch IC 131 of FIG. 4B), other than avoidance of charging noise using a change in the configuration of the components as described above in connection with FIGS. 1 to 14.

A charging noise avoidance method of the electronic device capable of wireless charging for the pen-type input device may include the operation of executing a pre-noise mode for the touch IC (e.g., the touch IC 131 of FIG. 4B) in a state in which the pen-type input device 120 is inserted or mounted on the electronic device and the operation of executing a noise mode for the touch IC (e.g., the touch IC 131 of FIG. 4B) when the noise level acting on the touch panel is a predesignated value or more.

The above-described operations may be performed by the processor (e.g., the processor 130 of FIG. 4B) included in the electronic device. The processor 130 may include the touch IC 131, the analog front end 133, and the micro controller unit 134 as described above in connection with FIG. 4B. The touch IC may be a processor connected with the touch panel and may be operated dependently from the operation performed by the processor or operated to independently perform a designated function. An embodiment in which the analog front end 133 and the micro controller unit 134 are integrated into the touch IC 131 is described below for convenience of description.

Referring to FIG. 15, in operation 1501, the processor may detect whether the pen-type input device is inserted into the electronic device. Whether the pen-type input device is inserted may be detected by using a switch toggled when the pen-type input device is inserted or through the charging signal received from the wireless charging coil of the pen tip portion of the pen-type input device. Other various methods for detecting whether the pen-type input device is inserted may be used.

In operation 1502, the processor (e.g., the processor 130 of FIG. 4B) may notify the touch IC (e.g., the touch IC 131 of FIG. 4B) of the state where the pen is inserted. This may be for performing the operations of the charging noise avoidance method using the touch IC, which is driven at lower power than the processor, in the future.

In operation 1503, it may be determined whether to perform wireless charging on the pen-type input device. For example, when the pen-type input device does not proceed with wireless charging or need not wireless charging (e.g., 100% charged state), the charging noise avoidance operation may not be required to be performed. When the pen-type input device does not proceed with wireless charging or does not need wireless charging (e.g., 100% charged state), in operation 1504, the pen detection state may be identified again by identifying whether the pen-type input device is in the state of being inserted in the electronic device (operation 1501) or in the state of being removed from the electronic device (operation 1505).

The touch IC may serve to adjust the sensitivity of the touch panel. When wireless charging for the pen-type input device from the electronic device is in progress, the wireless charging frequency may interfere with the frequency for touch input transmission/reception of the touch panel. In other words, the touch input sensitivity of the touch panel may be deteriorated by the charging noise caused by the wireless charging pad. According to various embodiments of the disclosure, in operation 1506, to prevent the deterioration of the touch input sensitivity, the touch IC may be set to the pre-noise mode when wireless charging for the pen-type input device is in progress.

For example, setting the touch IC to the pre-noise mode may be changing the operation frequency of the touch panel to a frequency at which interference with the charging frequency when charging the pen-type input device is small (e.g. interference being smaller than a predetermined level). Here, changing the operation frequency to a frequency at which interference with the charging frequency is small may be changing the operation frequency to a frequency at which no harmonic is generated with the charging frequency. As another example, setting the touch IC to the pre-noise mode may be changing the gain of analog signal, such as frequency, voltage and/or current. As another example, setting the touch IC to the pre-noise mode may be changing the gain of digital signal through software correction (e.g., applying a software filter) for digital signals. According to operation 1506, the changed frequency may mean a frequency at which it has less interference with the charging frequency when charging the pen-type input device but, under such a condition, the sensitivity of the touch panel has been enhanced. As another example, setting the touch IC to the pre-noise mode may be increasing the sampling count for the touch input to the touch panel. If the sampling count for the touch input increases, power consumption may somewhat increase, but the accuracy of touch input may increase.

In operation 1507, the charging noise acting on the touch panel may be detected and, according to the magnitude of charging noise (noise level), the touch IC may be set to the noise mode (operation 1508) or be set to return to a state before the pre-noise mode (operation 1503). For example, in operation 1507, it is determined whether the detected charging noise is a first designed value no or more. When the detected charging noise is the first designated value n or more, the touch IC may be set to the noise mode and, when less than the first designated value n, the setting of the touch IC to the pre-noise mode may be released. The charging noise may be measured and detected every designated time interval (or frame).

In operation 1508, if the noise level is detected as the first designated value n or more, the touch IC may be set to the noise mode. If the touch IC is set to the noise mode, it is possible to reduce the sensitivity of the touch panel or prevent a malfunction of the touch input by using the method of changing the operation frequency of the touch panel or the method of increasing sampling on the touch input. The switch of the touch IC to the noise mode according to operation 1508 is performed based on the pre-noise mode in operation 1506, so that neither a sharp change in touch panel sensitivity nor a drastic change in operation frequency occurs, preventing a malfunction of the touch panel. For example, when the touch IC is switched to the noise mode only based on the noise level measured in real-time, but not based on the pre-noise mode of the touch IC, the touch sensation on the touch panel may be deteriorated and, in some embodiments, the probability of a malfunction of the touch panel may increase.

In operation 1509, it is determine whether the noise level is a second designated value N or more. If the noise level is detected as the second designated value N or more, the noise mode of the touch IC may be maintained in operation 1510 and, if the noise level is detected as less than the second designated value N, it may be again compared with the first designated value n to determine whether to maintain the noise mode of the touch IC or release the pre-noise mode of the touch IC.

According to various embodiments, one or more of the above-described operations may be executed in a different order, omitted, or one or more other operations may be added. For example, the operation 1506 of setting the touch IC to the pre-noise mode may be performed without the previous operation 1503 of identifying whether wireless charging of the pen is in progress. In this case, the operation 1506 of setting the touch IC to the pre-noise mode may also be performed by identifying only the state in which the pen-type input device is inserted into the electronic device.

Figure 16:
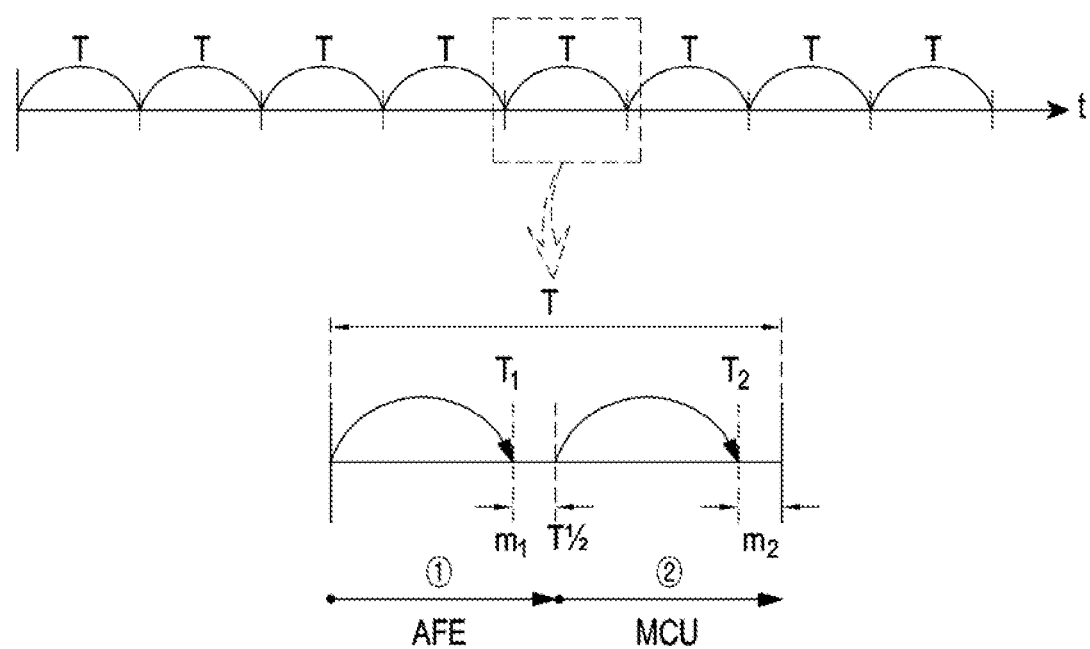
FIG. 16 is a view illustrating a tuning method in a pre-noise mode according to various embodiments of the disclosure.

FIG. 16 is a view illustrating a tuning method in a pre-noise mode according to various embodiments of the disclosure.

For example, the user input received on the touch panel may be sampled and measured at predetermined period T intervals on the time axis t shown in FIG. 16 by the touch IC (e.g., the touch IC 131 of FIG. 4B). In one period T, the user input may be input, as an analog signal generated based on the voltage level or amplitude, and be converted into a digital signal by an analog-digital converter (ADC). The user input may be defined by a signal aspect in an initially generated analog signal section ① and a converted digital signal section ② in one period (T). For example, when the user input is received on the touch panel, an analog signal T1 may be detected, and a digital signal T2 based on the analog signal may be detected. According to an embodiment, the analog signal section ① may be signal-processed using the analog front end (AFE) 133, and the digital signal section ② may be signal-processed using the micro controller unit (MCU) 134. Typically, given hardware tolerance or signal processing delay in the digital operation process, margins m1 and m2 may be set in the analog signal section ① and the digital signal section ②, respectively.

According to various embodiments of the disclosure, tuning in the pre-noise mode may be to change the frequency using margin m1 of the analog signal section or margin m2 of the digital signal section. According to an embodiment, it is possible to change the operation frequency of the touch panel into a frequency at which interference with the charging frequency when charging the pen-type input device is small (e.g., interference being smaller than a predetermined level), using margin m1 of the analog signal section or margin m2 of the digital signal section. Or, it is possible to increase sampling count (or section) for sensing a user input on the touch panel using margin m1 of the analog signal section or margin m2 of the digital signal section.

Figure 17:
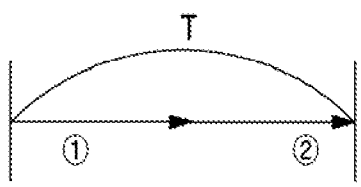
FIG. 17 is a view illustrating a touch performance per responding mode to charging noise of an electronic device according to various embodiments of the disclosure.

FIG. 17 is a view illustrating a touch performance per responding mode to charging noise of an electronic device according to various embodiments of the disclosure.

Referring to FIGS. 16 and 17 together, the electronic device may process the signal in the analog signal section ① and the digital signal section ② by an algorithm set as default, in a state in which the pen-type input device is not inserted (or disposed) in the receiving space of the electronic device, or although the pen-type input device is inserted (or disposed) in the receiving space of the electronic device, the wireless charging operation is not performed (e.g., normal state).

In contrast, in a state in which the pen-type input device is inserted (or disposed) in the receiving space of the electronic device (e.g., pre-noise state), the electronic device may be implemented as being in the pre-noise mode and, at this time, the signal in the analog signal section ① or digital signal section ② may be processed by an algorithm for maintaining the touch performance of the touch panel as maximum. Here, the algorithm for maintaining the touch performance of the touch panel as maximum may be an algorithm to implement a 'change in the operation frequency of the touch panel' or an 'increase in the sampling count for the touch input' as described above in connection with the embodiment of FIG. 15. Accordingly, the operation frequency of the touch panel may be changed into a frequency at which interference with the charging frequency when charging the pen-type input device is small. According to an embodiment, FIG. 17 illustrates changing the signal in the analog signal section ① among the analog signal section ① or the digital signal section ②, but without limitations thereto, it is also possible to change the signal in the digital signal section ②, rather than the signal in the analog signal section ①.

Further, when the noise level detected by the touch panel exceeds a predesignated value (e.g., noise state), the electronic device may change the signals in the analog signal section ① and digital signal section ② using the margins m1 and m2, respectively. Accordingly, the operation frequency of the touch panel may be changed into a frequency at which interference with the charging frequency when charging the pen-type input device is smaller than the interference in the pre-noise mode. As the signals in the analog signal section ① and digital signal section ② are together processed, the touch performance of the touch panel may be somewhat changed (e.g., temporary deterioration of touch performance). However, the noise mode step according to various embodiments of the disclosure is performed via the pre-noise mode step, preventing a malfunction of the touch panel.

Figure 18:
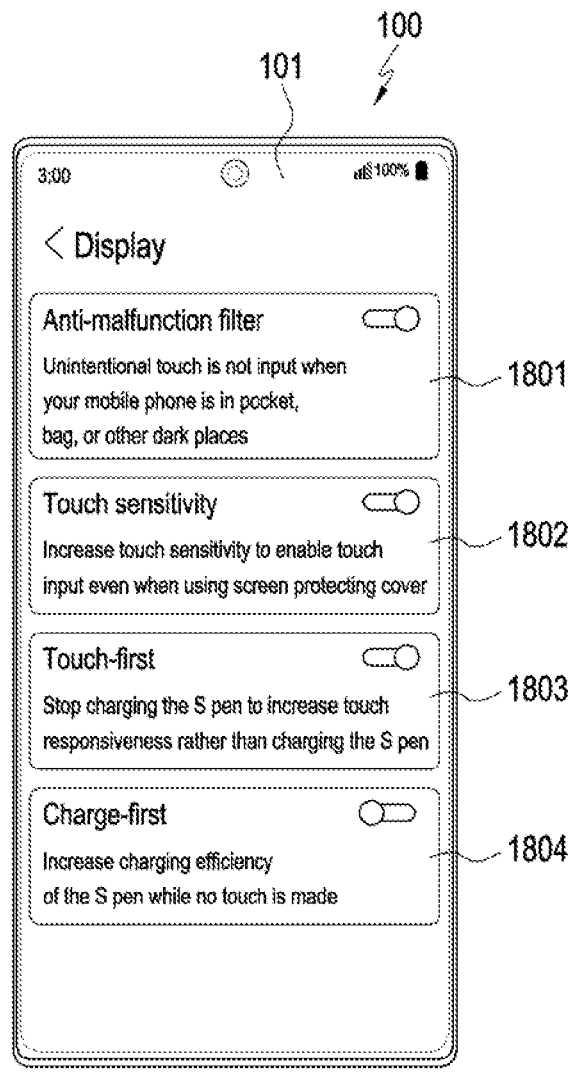
FIG. 18 is a view illustrating a display screen displayed on a display of an electronic device according to various embodiments of the disclosure.

FIG. 18 is a view illustrating a display screen displayed on a display 101 of an electronic device according to various embodiments of the disclosure.

FIG. 18 may show a display screen related to a touch input to the display 101 provided to the user. Various user input examples related to the operation of the touch panel may be displayed on the display screen.

For example, in a user input example 1801, the touch panel may be implemented with an anti-malfunction filter function to prevent unintentional touch input when the mobile phone is in the pocket or bag or other dark places.

As another example, in a user input example 1802, a touch sensitivity enhancing function may be implemented to increase the touch sensitivity to allow a touch to be entered even when a screen protecting cover is used.

As another example, in a user input example 1803, a touch-first function may be implemented which stops the charging operation of the S pen so as to increase touch responsiveness over charging the pen-type input device (e.g., the S pen). Here, the context to increase touch responsiveness may be, e.g., high-performance game play mode or user training mode, which may be directly designated and set by the user. When implementing the user input example 1803, e.g., the operations in the pre-noise mode or noise mode as described in connection with FIG. 15 may not be performed. Although not shown in the drawings in connection with the user input example 1803, as another embodiment, the noise level may be reduced by decreasing the charging current provided from the wireless charging pad during the wireless charging operation for the pen-type input device (e.g., a pen).

As another example, in the user input example 1804, when no touch is made, a function to further increase the efficiency of charging the pen-type input device (e.g., the S pen) may be performed. As another embodiment, although not shown in the drawings, in the user input example 1804, the touch sensitivity of the touch panel may be reduced to increase the efficiency of charging the pen-type input device (e.g., the S pen).

The embodiments related to the implementation of various functions of the touch panel shown in FIG. 18 are embodiments that may be additionally or alternatively implemented with the operation embodiments shown in FIG. 15, and other various embodiments may apply.

The electronic device 100 disclosed in the disclosure has a bar-type or plate-type appearance but the disclosure is not limited thereto. For example, the illustrated electronic device may be part of a rollable electronic device or a foldable electronic device. "Rollable electronic device" may mean an electronic device at least a portion of which may be wound or rolled or received in a housing (e.g., the housing 110 of FIG. 1) as the display 101 may be bent and deformed. As the display is stretched out or is exposed to the outside in a larger area according to the user's need, the rollable electronic device may use an expanded second display area. "Foldable electronic device" may mean an electronic device that may be folded in directions to face two different areas of the display or in directions opposite to each other. In general, in the portable state, the foldable electronic device may be folded so that the two different areas of the display face each other and, in an actual use state, the user may unfold the display so that the two different areas form a substantially flat shape. In some embodiments, according to various embodiments of the disclosure, the electronic device 100 may be interpreted as including various electronic devices, such as a laptop computer or a home appliance, as well as a portable electronic device, such as a smart phone.

According to various embodiments of the disclosure, in the electronic device, when the pen-type input device and the wireless charging pad in the position correspond thereto are disposed on one side of the touch panel, the conductive traces extending in the direction away from the pen-type input device and the wireless charging pad are disposed, minimizing influence by charging noise during the charging of the pen-type input device.

According to various embodiments of the disclosure, the method for operating the electronic device further includes a pre-noise mode to change the operation frequency of the touch IC into a frequency having less interference with the charging frequency when the pen-type input device is inserted into the internal space of the electronic device, minimizing influence by charging noise.

According to various embodiments of the disclosure, the method for operating the electronic device includes a pre-noise mode to change the operation frequency of the touch IC into a frequency having less influence on touch performance when the pen-type input device is inserted into the internal space of the electronic device, minimizing influence by charging noise.

According to various embodiments of the disclosure, the method for operating the electronic device may enter a mode (pre-noise mode) for preparing for charging noise all the time regardless of the noise level, allowing for entry into the noise mode when the noise level increases later, preventing a malfunction of the touch input to the touch panel.

The electronic device according to various embodiments may be one of various types of devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It is apparent to one of ordinary skill in the art that the electronic devices according to various embodiments of the present invention as described above are not limited to the above-described embodiments and those shown in the drawings, and various changes, modifications, or alterations may be made thereto without departing from the scope of the present invention.

What is claimed is:

1. An electronic device capable of wireless charging for a pen-type input device, the electronic device comprising:
    a display;
    a touch panel coupled to the display and having a plurality of sides facing in different directions, the plurality of sides including a first side, a second side opposite to the first side, a third side perpendicular to the first side, and a fourth side opposite to the third side;
    a first conductive trace disposed on the first side or the second side of the touch panel and connected to the first side or the second side of the touch panel to transfer a touch signal detected on the touch panel to a touch circuit;
    a second conductive trace disposed on the third side or the fourth side of the touch panel and connected to the third side or the fourth side of the touch panel to transfer a touch signal detected on the touch panel to the touch circuit; and
    a wireless charging pad configured to wirelessly transmit power to the pen-type input device and disposed at a position which is closer to the second side of the touch panel than to any one of the first side, the third side or the fourth side of the touch panel, to reduce interference of an operation of wireless charging for the pen-type input device,
    wherein the first conductive trace comprises:
    1-1th conductive traces disposed on the first side of the touch panel and extending along the first side of the touch panel in a downward direction substantially parallel to a longitudinal direction of the electronic device, and
    1-2th conductive traces disposed on the second side of the touch panel, extending along the second side of the touch panel, and
    wherein the 1-2th conductive traces extend in a direction away from the wireless charging pad and include a plurality of conductive traces,
    wherein each of the plurality of conductive traces extends in parallel to the second side in the downward direction from locations of the touch panel spaced apart from the wireless charging pad, and
    wherein an uppermost conductive trace among the plurality of conductive traces is spaced apart from the wireless charging pad by a predetermined distance, and each of conductive traces other than the uppermost conductive trace among the plurality of conductive traces is spaced apart from the wireless changing pad by a distance larger than the predetermined distance.

2. The electronic device of claim 1, further comprising a touch circuit for processing the touch signal,
    wherein the 1-1th conductive traces and the 1-2th conductive traces extend to the touch circuit while forming a single routing structure.

3. The electronic device of claim 1, further comprising a housing including an internal space for receiving the pen-type input device.

4. The electronic device of claim 3, wherein the wireless charging pad is disposed on the opposite side of the touch panel with respect to the pen-type input device.

5. The electronic device of claim 1, further comprising a housing,
    wherein the pen-type input device is attachable to an outer surface of the housing.

6. The electronic device of claim 5, wherein the wireless charging pad is disposed adjacent to a side of the housing.

7. A method for avoiding charging noise of an electronic device capable of wireless charging for a pen-type input device, the method comprising:
    determining whether the pen-type input device is inserted into or attached to the electronic device;
    determining whether the pen-type input device is being wirelessly charged based on the pen-type input device being inserted into or attached to the electronic device;
    setting a mode of a touch circuit of the electronic device to a pre-noise mode for reducing interference of an operation of wireless charging for the pen-type input device with an operation of a touch panel of the electronic device, based on the pen-type input device being inserted into or attached to the electronic device;
    detecting a noise level of the touch panel of the electronic device while the mode of the touch circuit being set to the pre-noise mode; and
    changing the mode of the touch circuit from the pre-noise mode to a noise mode based on the detected noise level being a predetermined value or more such that neither a sharp change in touch panel sensitivity nor a drastic change in operation frequency occurs,
    wherein the setting of the mode of the touch circuit to the pre-noise mode comprises changing an operation frequency of the touch panel to a first frequency at which interference with a charging frequency of the wireless charging is smaller than a predetermined level, and
    wherein the changing of the mode of the touch circuit from the pre-noise mode to the noise mode comprises changing the operation frequency of the touch panel from the first frequency to a second frequency at which the interference with the charging frequency of the wireless charging is smaller than the interference at the first frequency of the pre-noise mode.

8. The method of claim 7, wherein the setting of the mode of the touch circuit to the pre-noise mode comprises increasing a sampling count for touch input on the touch panel.

9. The method of claim 7, wherein the electronic device includes a wireless charging pad disposed adjacent to one side of the touch panel and a conductive trace disposed on another side opposite to the one side of the touch panel to transfer a touch signal detected on the touch panel to the touch circuit.

10. An electronic device comprising:
    a processor; and
    a memory storing instructions that, when executed by the processor, cause the electronic device to:

determine whether a pen-type input device is inserted into or attached to the electronic device, determine whether the pen-type input device is being wirelessly charged based on the pen-type input device being inserted into or attached to the electronic device, based on the pen-type input device being inserted into or attached to the electronic device, set a mode of a touch circuit of the electronic device to a pre-noise mode for reducing interference of an operation of wireless charging for the pen-type input device with an operation of a touch panel of the electronic device, based on the mode of the touch circuit being set to the pre-noise mode, detect a noise level of the touch panel, and change the mode of the touch circuit from the pre-noise mode to a noise mode based on the detected noise level being a predetermined value or more such that neither a sharp change in touch panel sensitivity nor a drastic change in operation frequency occurs, and wherein the setting of the mode of the touch circuit to the pre-noise mode comprises changing an operation frequency of the touch panel to a first frequency at which interference with a charging frequency of the wireless charging is smaller than a predetermined level, and wherein the changing of the mode of the touch circuit from the pre-noise mode to the noise mode comprises changing the operation frequency of the touch panel from the first frequency to a second frequency at which the interference with the charging frequency of the wireless charging is smaller than the interference at the first frequency of the pre-noise mode.

11. An electronic device capable of wireless charging for a pen-type input device, the electronic device comprising:
a display;
a touch panel coupled to the display and including a plurality of first patterns for generating a touch signal and a plurality of second patterns perpendicular to the plurality of first patterns and having a plurality of sides facing in different directions, the plurality of sides including a first side, a second side opposite to the first side, a third side perpendicular to the first side, and a fourth side opposite to the third side;

a conductive trace for transferring the touch signal to a touch circuit of the electronic device and including 1-1th conductive traces connected to one side of at least one of the plurality of first patterns, a 1-2th conductive traces connected to another side of at least one of the plurality of first patterns, a 2-1th conductive traces connected to one side of at least one of the plurality of second patterns, and a 2-2th conductive traces connected to another side of at least one of the plurality of second patterns; and a wireless charging pad for wirelessly transmitting power to the pen-type input device and disposed at a position which is closer to the second side of the touch panel than to any one of the first side, the third side or the fourth side of the touch panel, to reduce interference of an operation of wireless charging for the pen-type input device, wherein the 1-1th conductive traces are disposed on the first side of the touch panel and extend along the first side of the touch panel in a downward direction substantially parallel to a longitudinal direction of the electronic device, wherein the 1-2th conductive traces are disposed on the second side of the touch panel and extend along the second side of the touch panel, wherein the 1-2th conductive traces extend in a direction away from the wireless charging pad and include a plurality of conductive traces, wherein each of the plurality of conductive traces extends in parallel to the second side in the downward direction from locations of the touch panel spaced apart from the wireless charging pad, and wherein an uppermost conductive trace among the plurality of conductive traces is spaced apart from the wireless charging pad by a predetermined distance, and each of conductive traces other than the uppermost conductive trace among the plurality of conductive traces is spaced apart from the wireless changing pad by a distance larger than the predetermined distance.

* * * * *